(12) United States Patent
Goto et al.

(10) Patent No.: US 6,633,591 B2
(45) Date of Patent: *Oct. 14, 2003

(54) SWITCH DEVICE AND SYSTEM

(75) Inventors: Mamoru Goto, Tachikawa (JP);
Takeshi Uehara, Tachikawa (JP);
Fumiko Senba, Tachikawa (JP);
Umihiko Motoki, Tachikawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 124 days.

(21) Appl. No.: 08/989,790

(22) Filed: Dec. 12, 1997

(65) Prior Publication Data

US 2001/0043623 A1 Nov. 22, 2001

(30) Foreign Application Priority Data

Feb. 26, 1997 (JP) .............................................. 9-042331

(51) Int. Cl.[7] .................................................. H04J 3/12
(52) U.S. Cl. ......................... 370/524; 379/225; 379/229
(58) Field of Search ................................. 370/522, 524, 370/525, 526, 527, 529; 379/219, 220, 221, 225, 226, 227, 228, 229, 231, 232, 234, 236

(56) References Cited

U.S. PATENT DOCUMENTS

| | | | | |
|---|---|---|---|---|
| 5,062,108 A | * | 10/1991 | Bales et al. | 370/467 |
| 5,185,742 A | * | 2/1993 | Bales et al. | 370/409 |
| 5,212,691 A | * | 5/1993 | Hokari | 370/384 |
| 5,319,640 A | * | 6/1994 | Yamasaki et al. | 370/362 |
| 5,422,943 A | * | 6/1995 | Cooney et al. | 379/225 |
| 5,436,889 A | * | 7/1995 | Matsumoto et al. | 370/385 |
| 5,442,622 A | * | 8/1995 | Hokari | 370/217 |
| 5,452,349 A | * | 9/1995 | Uehara et al. | 379/211 |
| 5,455,855 A | * | 10/1995 | Hokari | 379/229 |
| 5,475,744 A | * | 12/1995 | Ikeda | 375/127 |
| 5,521,970 A | * | 5/1996 | Herrick et al. | 379/201 |
| 5,579,383 A | * | 11/1996 | Bales et al. | 379/210 |
| 5,818,921 A | * | 10/1998 | Vander Meiden et al. | 379/225 |
| 5,867,568 A | * | 2/1999 | Ackerman et al. | 379/201 |
| 5,912,887 A | * | 6/1999 | Sehgal | 370/354 |

* cited by examiner

Primary Examiner—Douglas Olms
Assistant Examiner—Bob A. Phunkulh
(74) Attorney, Agent, or Firm—Katten Muchin Zavis Rosenman

(57) ABSTRACT

A switch device connectable to an ISDN includes a first part which adds a calling ID information element to a first call setup message to be transferred over an ISDN tie line connecting the switch device to another switch device. The calling ID information element includes identification information on a terminal which is connected to the ISDN and makes a call.

14 Claims, 29 Drawing Sheets

F I G. 3
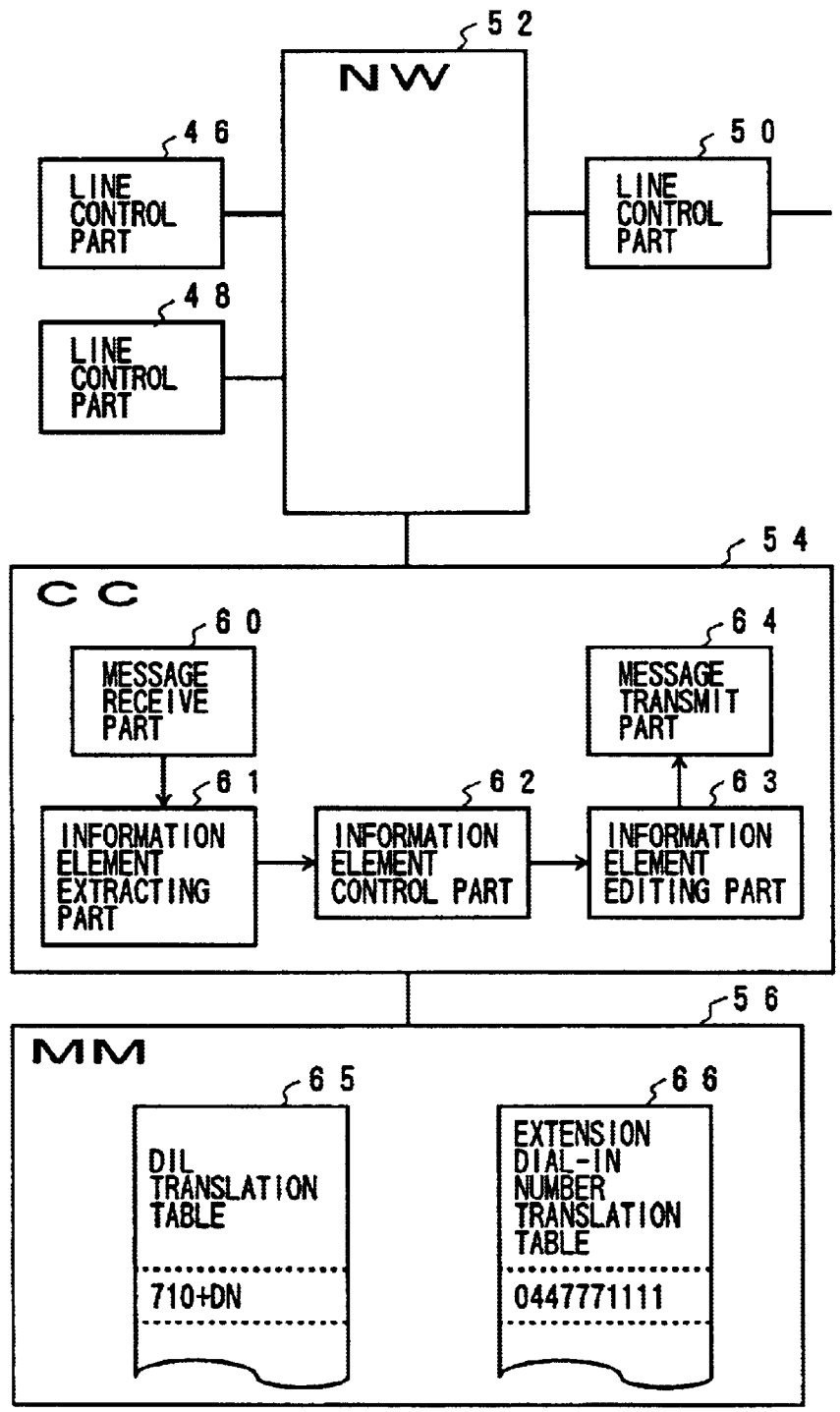

SWITCH DEVICE AND SYSTEM

BACKGROUND OF THE INVENTION

1. Field of the Invention

The present invention generally relates to a private branch exchange (PBX) network system, and more particularly to a private branch exchange network system including a plurality of private branch exchanges connected to an integrated services digital network (ISDN).

2. Description of the Related Art

FIG. 1 is a diagram showing a PBX network having PBXs 10 and 12 connected to an ISDN 14. The PBXs 10 and 12 are local switch devices. An ISDN tie line 16 connects the PBXs 10 and 12 together. Terminals such as telephone sets are connected to the PBXs 10 and 12 so that a PBX network is formed. For the sake of simplicity, only one telephone set 18 connected to the PBX 10 is illustrated, and only one telephone set 20 connected to the PBX 12 is illustrated. The telephone sets 18 and 20 are respectively connected to extensions of the PBXs 10 and 12, and will be referred to as extension telephone sets hereinafter.

The PBX 10 sends a message to the PBX 12 over the ISDN tie line 16, and PBX 12 sends a message to the PBX 10 thereover. For example, the message sent by the PBX 10 includes the identification number of the PBX 10, and a ID of the calling terminal, that is, the extension telephone set 18. In FIG. 1, the PBXs 10 and 12 are respectively assigned identification numbers "700" and "710", and the extension telephone sets 18 and 20 are respectively assigned IDs "A" and "B".

Telephone sets 22 and 24 are connected to the ISDN 14, and are assigned IDs "X" and "Y", respectively. The telephone set 22 can call the extension telephone set 20 via the ISDN 14, the PBX 10, the ISDN tie line 16 and the PBX 12. However, in this case, the message sent to the PBX 12 from the PBX 10 includes the identification number "700" of the PBX 10 and the identification number of the ISDN network, but does not include the ID "X" of the calling telephone set 22. Hence, the called telephone set 20 is not informed of the ID "X" of the calling telephone set 22. This is inconvenient when the extension telephone set 20 calls the telephone set 22 by return.

The extension telephone set 18 can call the telephone set 24 via the ISDN tie line 16, the PBX 12, the ISDN 14. In this case, the message sent to the PBX 12 from the PBX 10 includes the identification number "700" of the PBX 10 and the ID "A" of the calling telephone set 18. However, the message sent to the telephone set 24 from the ISDN 14 does not include the ID "A" of the calling telephone set 18. This is inconvenient when the telephone set 24 calls the extension telephone set 18 connected to the PBX 10 by return.

SUMMARY OF THE INVENTION

It is a general object of the present invention to provide a switch device and a system in which the above disadvantages are eliminated.

A more specific object of the present invention is to provide a switch device and a system capable of informing a called terminal of information indicative of the identification of the calling terminal, which may be accommodated by a local switch (PBX) or an ISDN, so that the identification information of the calling terminal can be displayed or the called terminal can easily call the calling terminal by return.

These objects of the present invention are achieved by a switch device connectable to an ISDN, the switch device comprising: a first part which adds a calling ID information element to a first call setup message to be transferred over an ISDN tie line connecting the switch device to another switch device, the calling ID information element including identification information on a terminal which is connected to the ISDN and makes a call.

The switch device may further comprise a second part which receives the first call setup message transferred via the ISDN tie line from another switch device and writes the calling ID information element into a second call setup message to be transferred over the ISDN so that the switch device calls the terminal connected to the ISDN.

The switch device may further comprise a third part which allows a first extension terminal connected to the switch device to communicate with the terminal connected to the ISDN upon receiving a call therefrom and then calls a second extension terminal connected to another switch device or another terminal connected to the ISDN via the ISDN tie line.

The above objects of the present invention are also achieved by a switch device connectable to an ISDN, the switch device comprising: a first part which translates an extension number of an extension terminal connected to the switch device into a dial-in number; and a second part which adds the dial-in number to a first call setup message to be transferred over an ISDN tie line connecting the switch device to another switch device.

The switch device may further comprise a third part which receives the first call setup message transferred via the ISDN tie line from another switch device and writes the dial-in number into a second call setup message to be transferred over the ISDN so that the switch device calls the terminal connected to the ISDN.

The switch device may further comprise a fourth part which allows a first extension terminal connected to the switch device to communicate with the terminal connected to the ISDN upon receiving a call therefrom and then calls a second extension terminal connected to another switch device or another terminal connected to the ISDN via the ISDN tie line.

The above objects of the present invention are also achieved a system comprising: a first device and a second device which are connected to an ISDN, the first switch device comprising: a first part which adds a calling ID information element to a first call setup message to be transferred over an ISDN tie line connecting the first and second switch devices together, the calling ID information element including identification information on a terminal which is connected to the ISDN and makes a call.

The system may be configured so that the second switch device comprises a second part which receives the first call setup message transferred from the first switch device via the ISDN tie line and writes the calling ID information element into a second call setup message to be transferred over the ISDN so that the second switch device calls the terminal connected to the ISDN.

The system may be configured so that the first switch device comprises a third part which allows a first extension terminal connected to the first switch device to communicate with the terminal connected to the ISDN upon receiving a call therefrom and then calls a second extension terminal connected to the second switch device or another terminal connected to the ISDN via the ISDN tie line.

The system may be configured so that the first switch device comprises a third part which allows a first extension terminal connected to the first switch device to communicate with the terminal connected to the ISDN upon receiving a call therefrom and then calls a second extension terminal connected to the second switch device or another terminal connected to the ISDN via the ISDN tie line.

The above objects of the present invention are also achieved by a system comprising: a first switch and a second switch connected to an ISDN, the first switch device comprising: a first part which translates an extension number of an extension terminal connected to the first switch into a dial-in number; and a second part which adds the dial-in number to a first call setup message to be transferred to the second switch over an ISDN tie line connecting the first and second switch devices together.

The system may be configured so that the first switch device comprises a third part which receives the first call setup message transferred over the ISDN tie line from the first switch device and writes the dial-in number into a second call setup message to be transferred over the ISDN so that the second switch device calls the terminal connected to the ISDN.

The system may be configured so that the first switch device comprises a fourth part which allows a first extension terminal connected to the first switch device to communicate with the first terminal connected to the ISDN upon receiving a call therefrom and then calls a second extension terminal connected to the second switch device or another terminal connected to the ISDN via the ISDN tie line.

BRIEF DESCRIPTION OF THE DRAWINGS

FIG. 3 is a block diagram of a PBX shown in FIG. 2;

DESCRIPTION OF THE PREFERRED EMBODIMENTS

Figure 1:
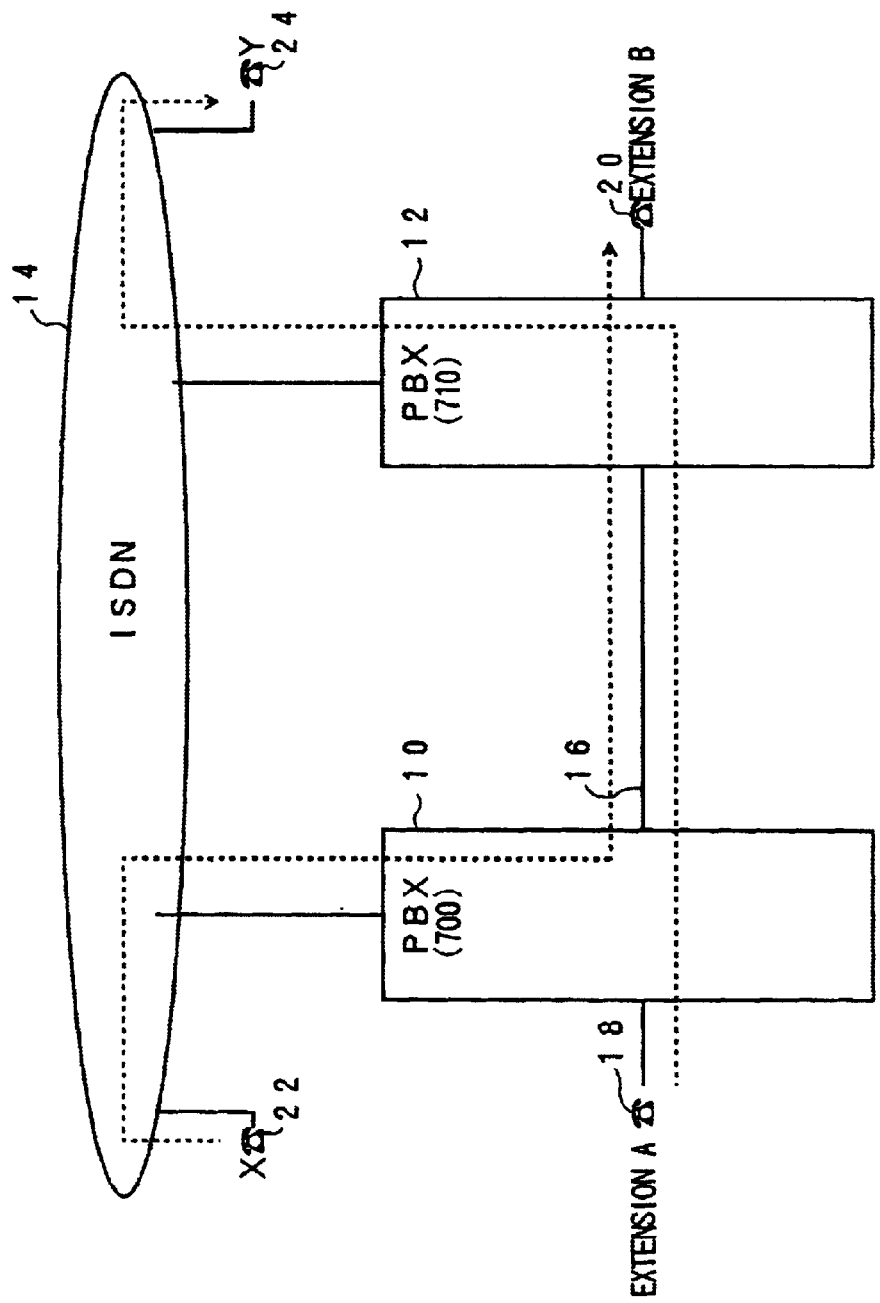
FIG. 1 is a block diagram of a PBX network having PBXs connected to an ISDN.
Figure 2:
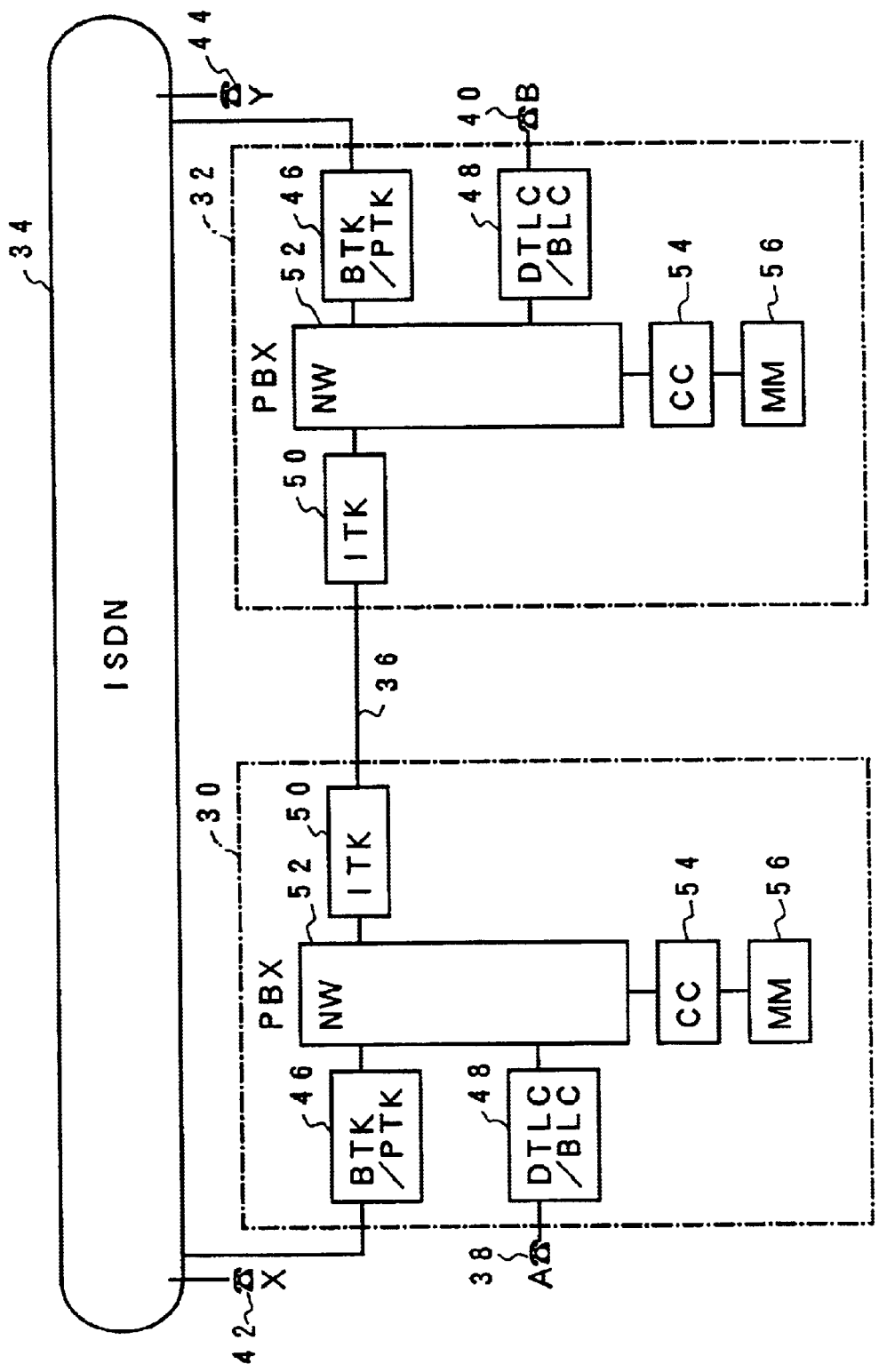
FIG. 2 is a block diagram of an embodiment of the present invention.

FIG. 2 shows switch devices and a system using these switches according to an embodiment of the present invention. Referring to FIG. 2, PBXs 30 and 32, which are switch devices, are connected to an ISDN 34, which is a public network. An ISDN tie line 36 connects the PBXs 30 and 32 together. Terminals such as telephone sets are connected to the PBXs 30 and 32 so that a PBX network which is a private network is formed. For the sake of simplicity, only one telephone set 38 connected to the PBX 30 and assigned an ID "A" is illustrated, and only one telephone set 40 connected to the PBX 32 and assigned an ID "B" is illustrated. Telephone sets 42 and 44 respectively assigned IDs "X" and "Y" are connected to the ISDN 34.

FIG. 3 is a block diagram of each of the PBXs 30 and 32 shown in FIG. 2. The PBX includes line control parts 46, 48 and 50, a network (switch) part 52, a controller (CC) 54 formed of, for example, a processor or a CPU, and a main memory (MM) 56. The line control part 46 includes BTK (ISDN BRI switch office trunk) cards, and PTK (ISDN PRI switch office trunk) cards, and controls a line connection with the ISDN 34. The line control part 48 includes DTLC (Digital Terminal Line Circuit) cards and BLC (BRI line circuit) cards, and controls a line connection with the extension telephone set 38 or the like. The line control part 50 includes ITK trunks (ISDN tie line trunks), and controls a line connection with the ISDN tie line 36.

The controller 54 performs a message translation control in addition to the above line connection control. The message translation control is carried out by a message receive part 60, an information element extracting part 61, an information element control part 62, an information element editing part 63, and a message transmit part 64.

The main memory 56 includes a DIL (Direct In Line) translation table 65 storing information necessary for line connections, and an extension dial-in number translation table 66. The controller 54 refers to the DIL translation table 65 when performing the line connection control. The table 66 is used when the controller 54 executes the message translation control.

Figure 4:
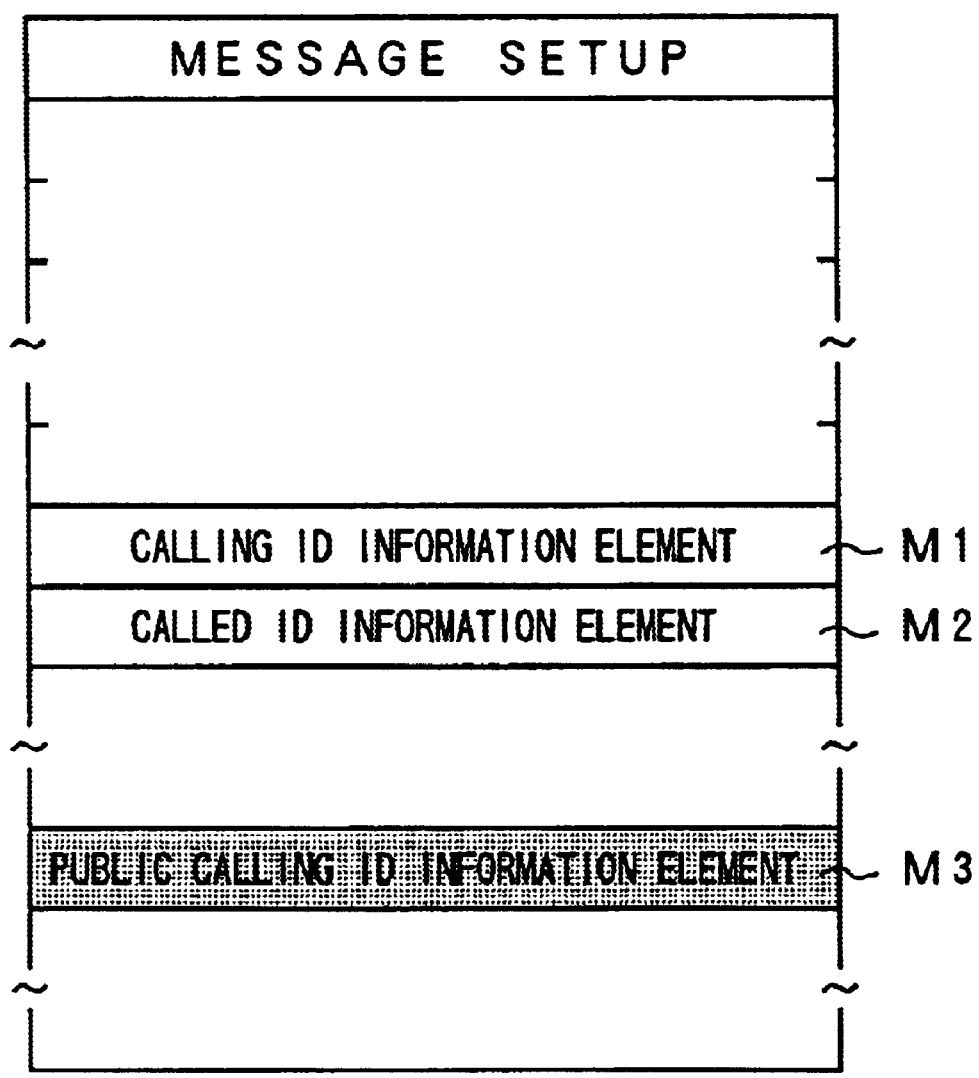
FIG. 4 is a diagram of a format of a call setup message.
Figure 5:
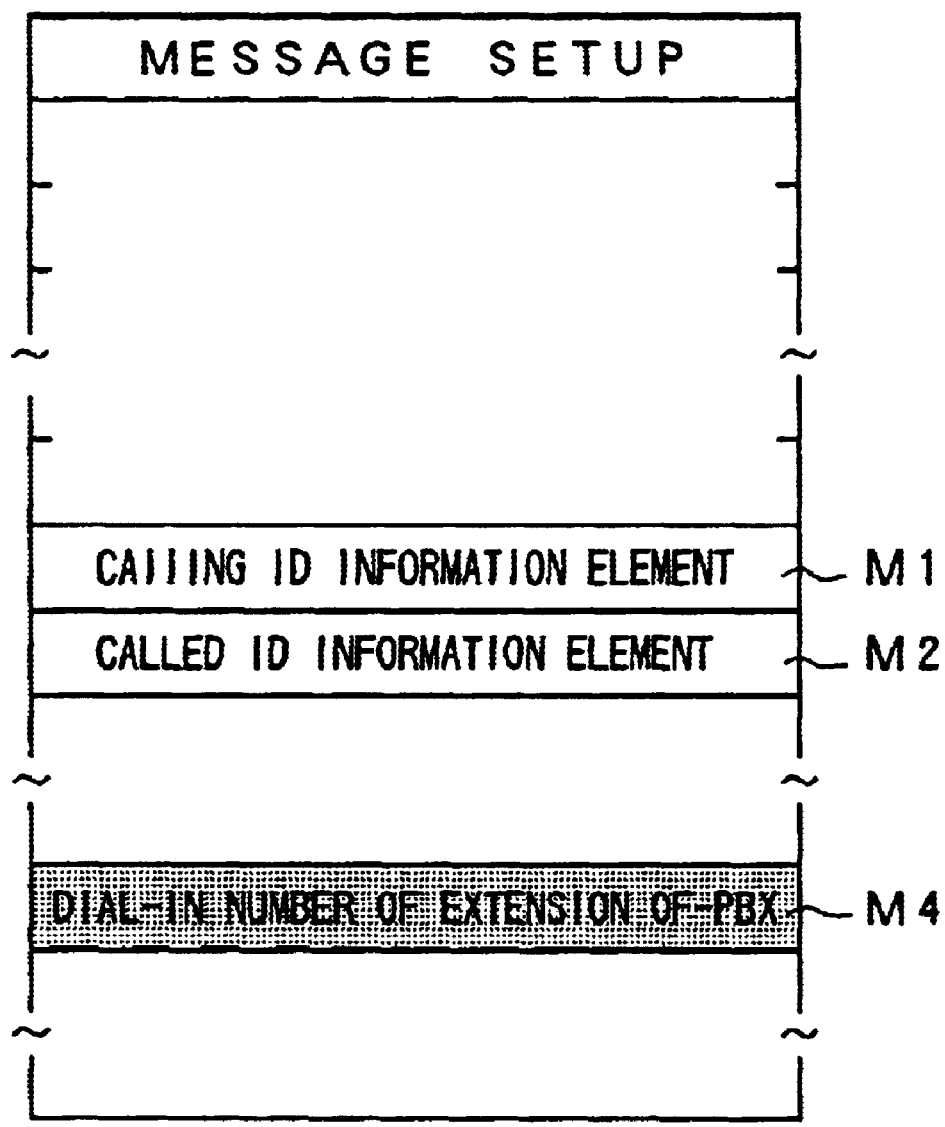
FIG. 5 is a diagram of a format of another call setup message.

FIGS. 4 and 5 show formats of call setup messages (SETUP) transferred over the ISDN tie line 36. Each of the messages includes two code sets named code set #0 and code set #7. Code set (which can be described as codeset) #0 of the call setup message shown in FIG. 4 includes a calling ID information element M1 for discriminating a calling terminal, and a called ID information element M2 for discriminating a called terminal. Code set #7, which is an additional code set, includes calling ID information element M3 for discriminating a call terminal connected to the ISDN 34. The above two code sets are defined in the Recommendation Q.931, the disclosure of which is hereby incorporated by reference.

Code set #0 of the call setup message shown in FIG. 5 includes the calling ID information element M1 and the called ID information element M2. Code set #7 serves as an additional service information element, and includes a PBX extension dial-in number M4, which may be the dial-in numbers of the extension telephone sets 38 and 40 connected to the PBXs 30 and 32, respectively.

The message receive part 60 receives a message from the line control part 46 or 50. The received message is sent to the information element extracting part 61. If the received message is the above-mentioned call setup message, the information element extracting part 61 extracts therefrom the calling ID information element M1, the called ID information element M2, the calling ID information element M3 and the dial-in number M4. The extracted information elements are supplied to the information element control part 62.

The information element control part 62 searches the DIL translation table 65 by using the called ID information element M2 included in the message sent from the line control part 46 or 50, and translates it into the number of the PBX (PBX number) and the extension number. If a call is generated by an extension telephone set via the line control part 48, the information element control part 62 searches the extension dial-in number translation table 66, and obtains the dial-in number of the above extension telephone set. The information element editing part 63 writes the PBX number and the extension number obtained by searching the table 65 into the called ID information element M2 of the call setup message. Further, the information element editing part 63 writes the extracted calling ID information element M1 into the calling ID information element M3 of the call setup message. Furthermore, the information element editing part 63 writes the extracted calling ID information element M3 into the calling ID information element M1 of the call setup message. Moreover, the information element editing part 63 writes the extension number obtained by searching the extension dial-in number translation table 66 into the dial-in number M4 of the call setup message. The information element editing part 63 writes the extracted dial-in number M4 into the calling ID information element M1 of the call setup message. Then, the message transmit part 64 sends the message thus edited to the line control part 46 or 50.

Figure 6A:
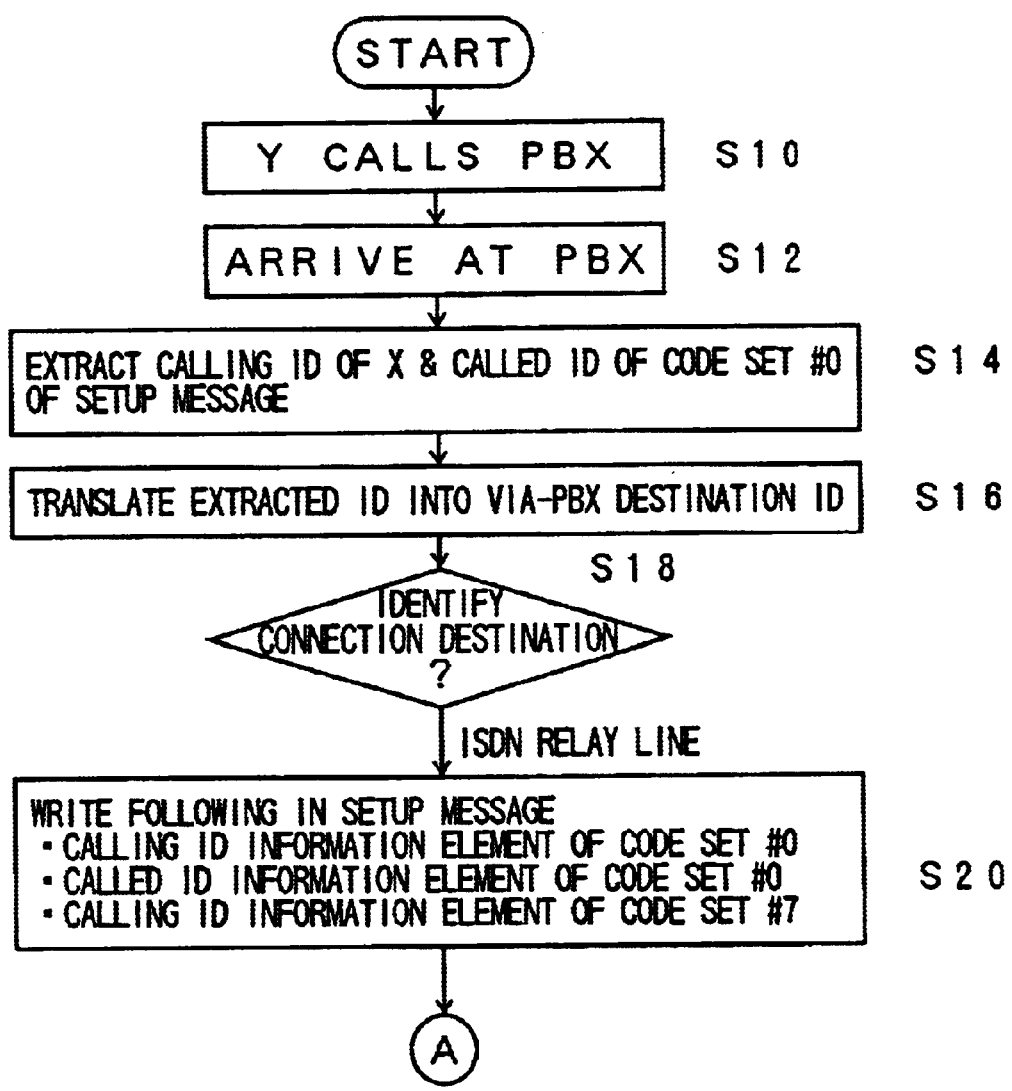
FIGS. 6A and 6B are flowcharts of a control sequence of the embodiment of the present invention.
Figure 6B:
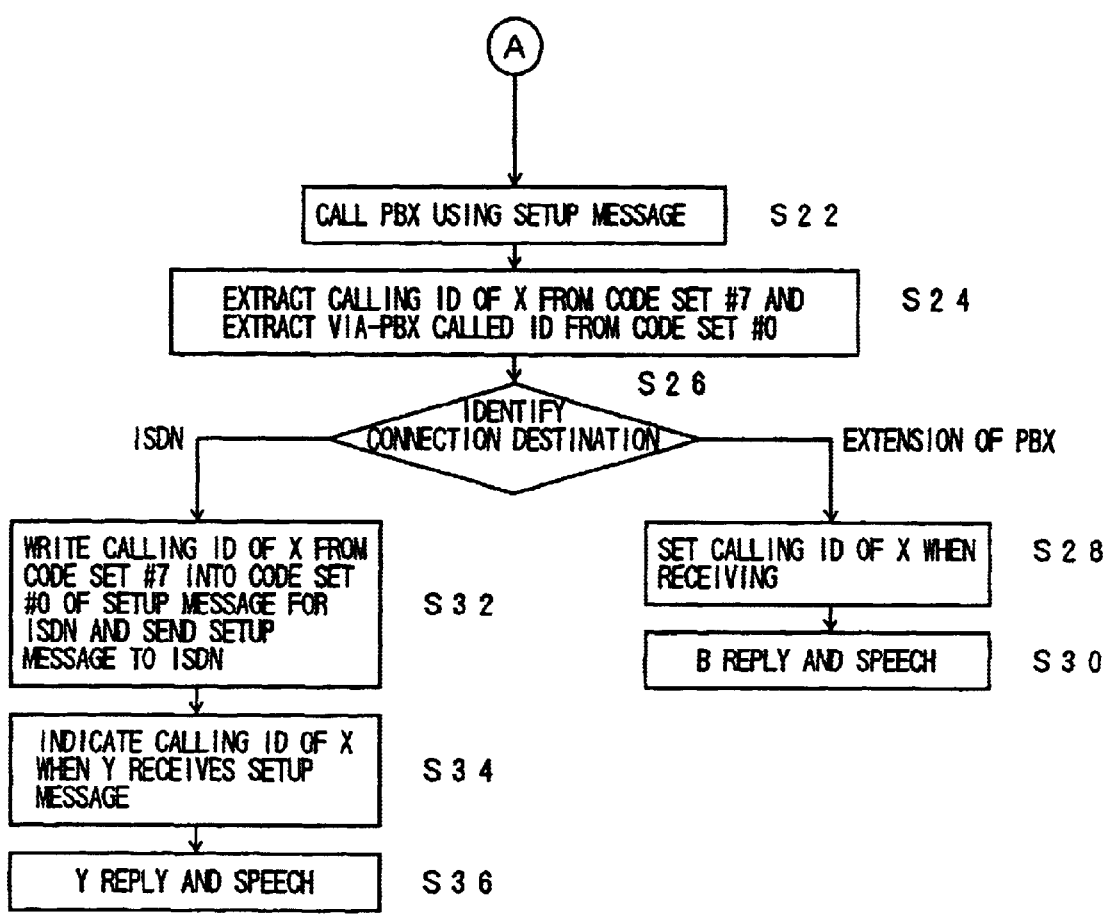

FIGS. 6A and 6B are flowcharts of a sequence in which the telephone set 42 generates a call which should be sent to the ISDN 34, the PBX 30, the ISDN tie line 36 and the PBX 32. In this sequence, there are two cases, in one of which cases the call is addressed to the extension telephone set 40 accommodated by the PBX 32. In the other case, the call is transferred via the PBX 32 and is addressed to the telephone set 44 connected to the ISDN.

Figure 7:
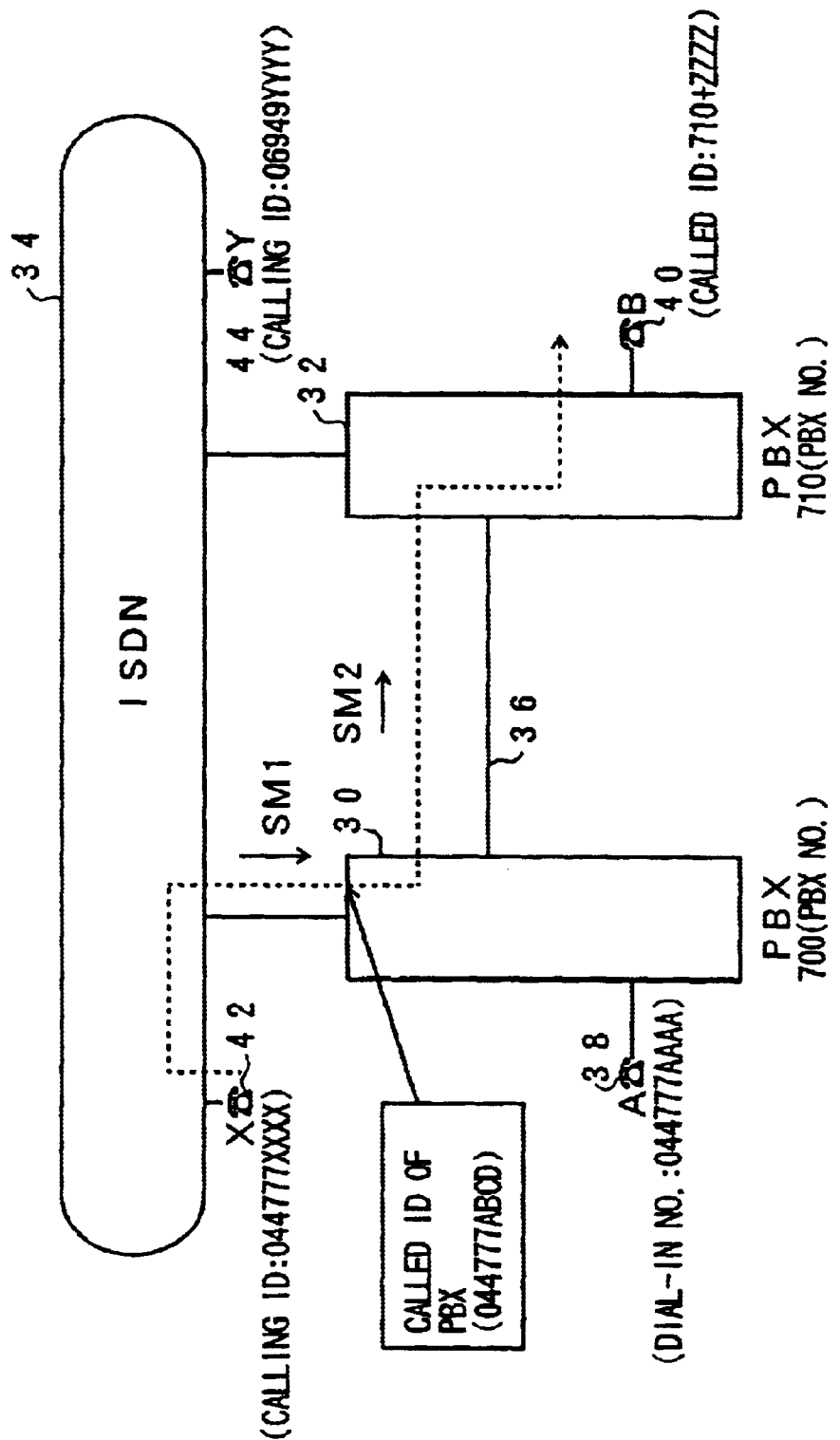
FIG. 7 is a block diagram showing a first operation of the embodiment of the present invention
Figure 8:
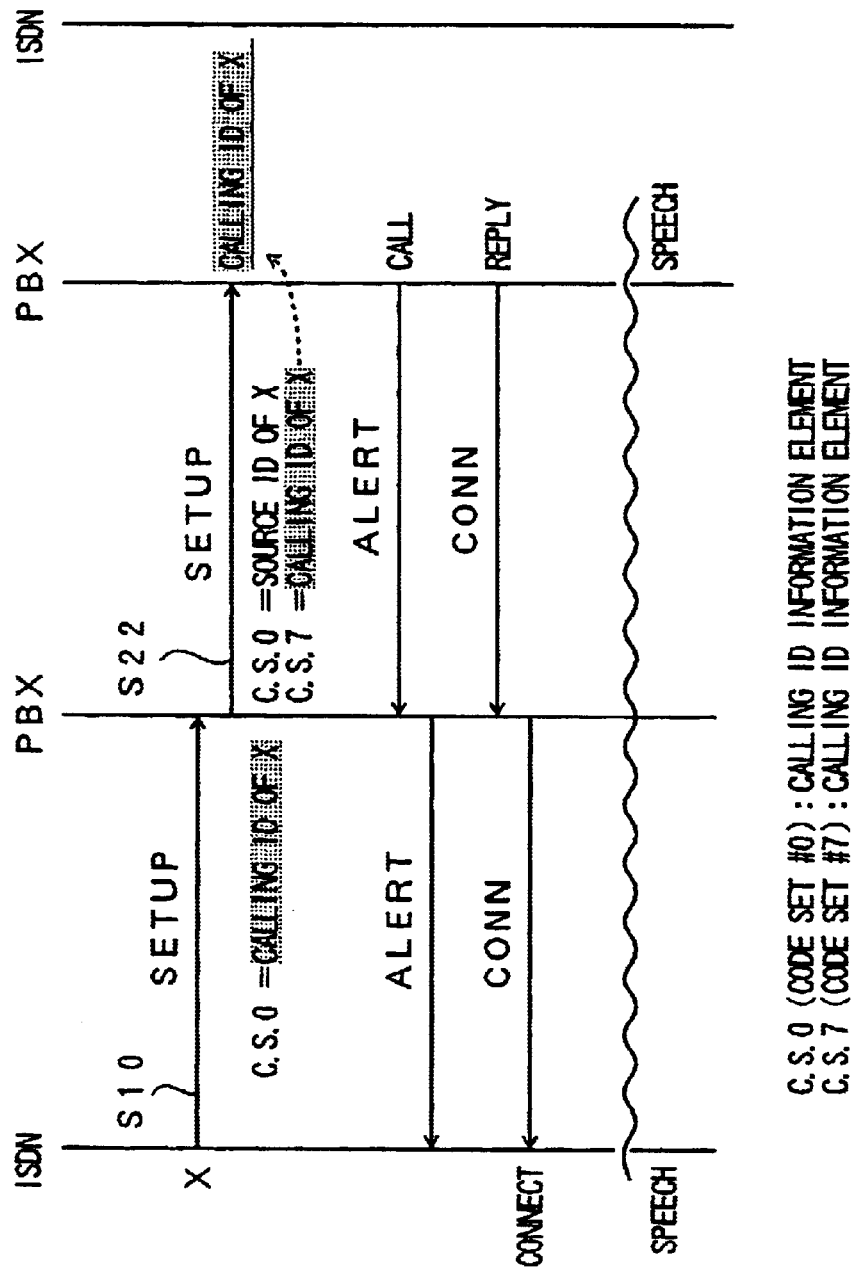
FIG. 8 is a sequence diagram of an information transfer during the first operation of the embodiment of the present invention.

First, the case where a call is addressed to the extension telephone set 40 will be described with reference to FIG. 7, in which a call is transferred as indicated by the broken line. FIG. 8 will also be referred to in order to explain how information is transferred. Step numbers shown in FIG. 7 correspond to those shown in FIG. 8. Further, FIG. 9 which explains the call setup message will be referred to.

Figure 9:
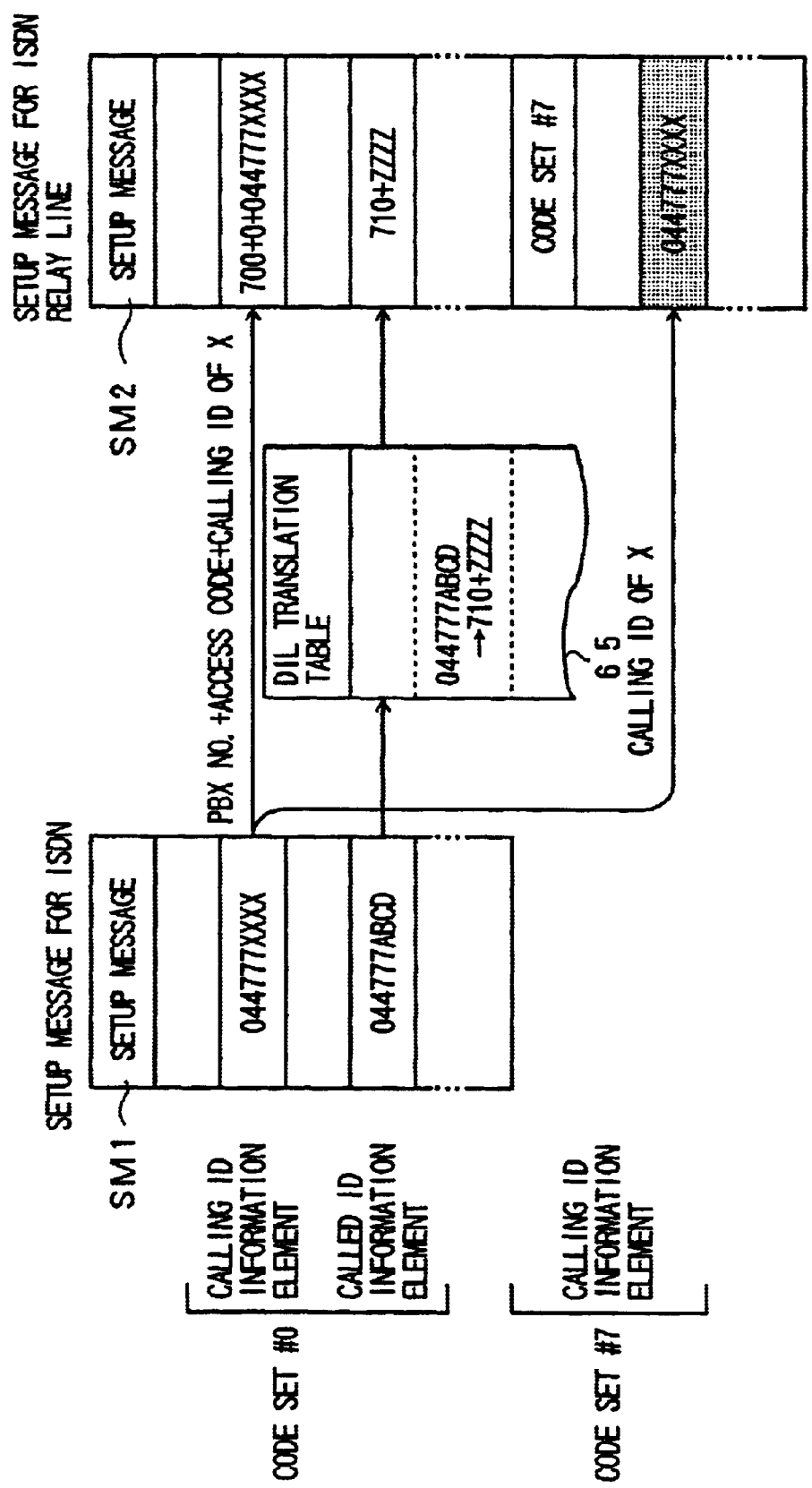
FIG. 9 is a diagram showing call setup messages used in the first operation of the embodiment of the present invention.

At step S10, the telephone set 42 connected to the ISDN 34 sends a call to the PBX 30. Hence, a call setup message SM1 shown in FIG. 9 is sent to the PBX 30 from the ISDN network 34. The call setup message SM1 includes "044777XXXX" and "044777ABCD", which are respectively the calling ID information element and the called ID information element of code set #0.

At step S12, the call arrives at the PBX 30. At step S14, the controller 54 of the PBX 30 extracts the calling ID information element and the called ID information element from code set #0 of the call setup message SM1. At step S16, the controller 54 refers to the DIL translation table 65, and translates the extracted called ID information element into the called ID information via the PBX 32. In the present example, "044777ABCD" is translated into "710+ZZZZ".

At step S18, the controller 54 refers to the called ID information and thus identifies the remote terminal to which the call should be connected. In the present case, the called to which the call should be connected is the ISDN tie line 36. Thus, the process proceeds to step S20. At step S20, the controller 54 assembles a call setup message for the ISDN tie line 36 so that it includes the calling ID information element M1 "700", prefix dial number "0", and the extracted calling ID information element "044777XXXX". The above "700" is the number of the PBX 32 to which the call should be transferred. The above prefix dial number "0" indicates a connection of a line between the PBX 30 and the ISDN 34. Further, the via-PBX32 called ID information element "710+ZZZZ" obtained at step S16 is written into the called ID information element of code set #0 of the call setup message SM2. The calling ID information element "044777XXXX" extracted at step S14 is written into the calling ID information element M3 of code set #7. At step S22, the call setup message SM2 thus assembled is sent to the PBX 32.

At step S24, the controller 54 of the PBX 32 extracts the calling ID information element "044777XXXX" of the telephone set 42 from the calling ID information element of code set #7 of the call setup message transferred over the ISDN tie line 36, and extracts the called ID information element of code set #0. At step S26, the controller 54 identifies the connection called from the extracted called ID information element. In the present case, the connection called is the extension telephone set 40 of the PBX 32, and thus the process proceeds to step S28. At step S28, the calling ID information of the telephone set 42 extracted at step S24 is set to the extension telephone set 40 at the time when the call is received. The calling ID information element "044777XXXX" of the telephone set 42 is displayed on the extension telephone set 40. Hence, the telephone set 40 can make a return call. Then, the extension telephone set 40 replies to the call at step S30, so that a mutual communication between the extension telephone set 40 and the telephone set 42 can take place.

Figure 10:
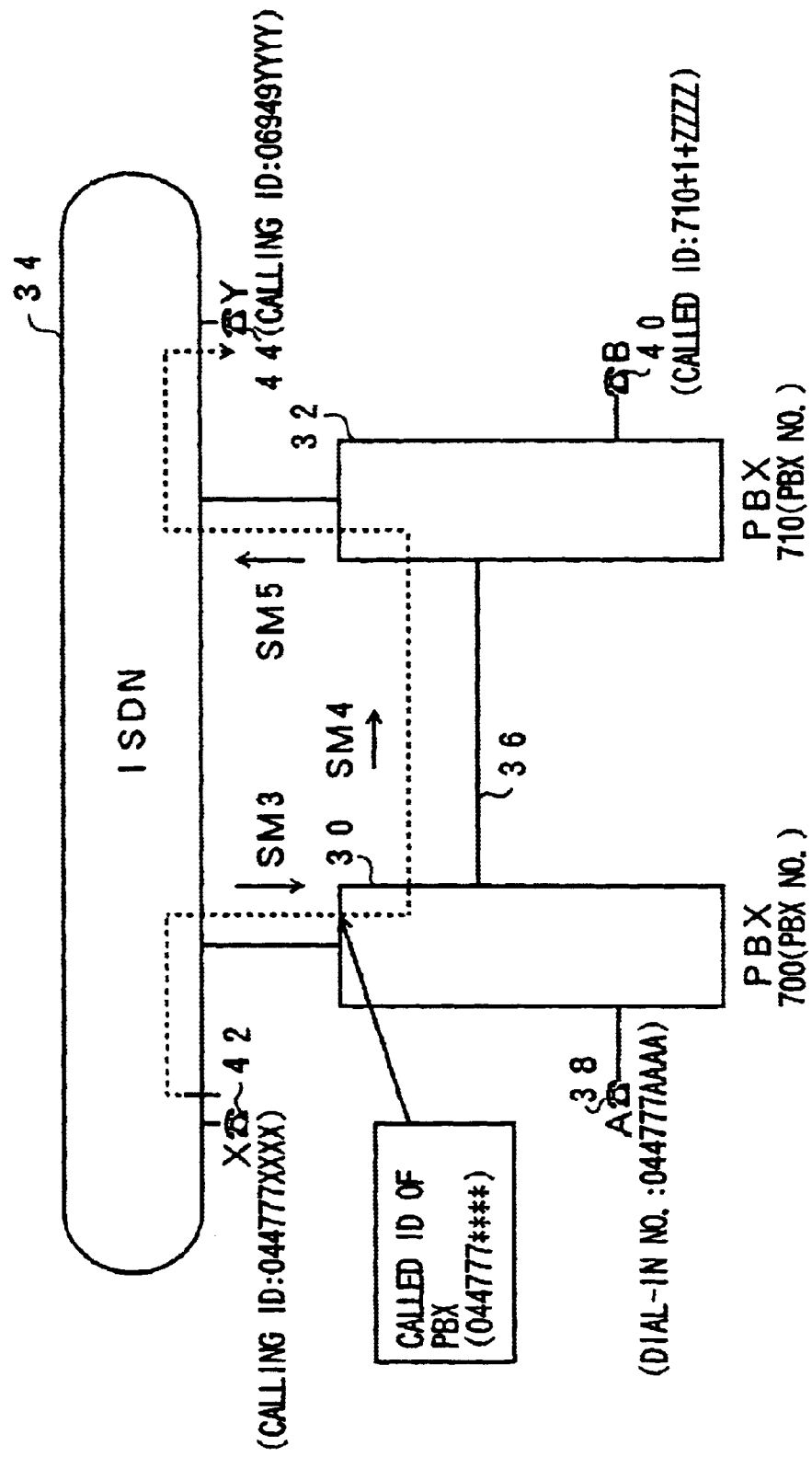
FIG. 10 is a block diagram showing a second operation of the embodiment of the present invention.
Figure 11:
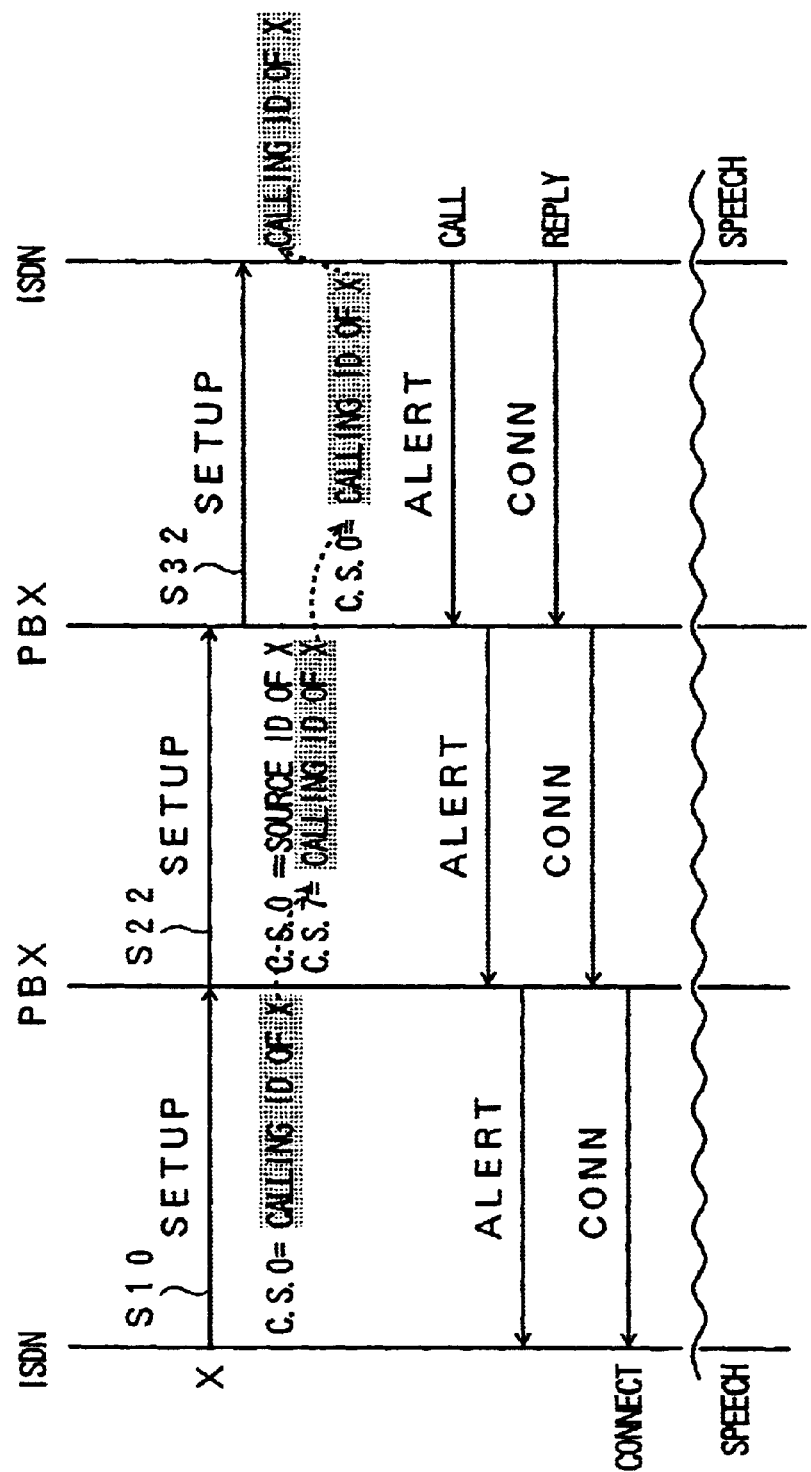
FIG. 11 is a sequence diagram of an information transfer carried out during the second operation.
Figure 12:
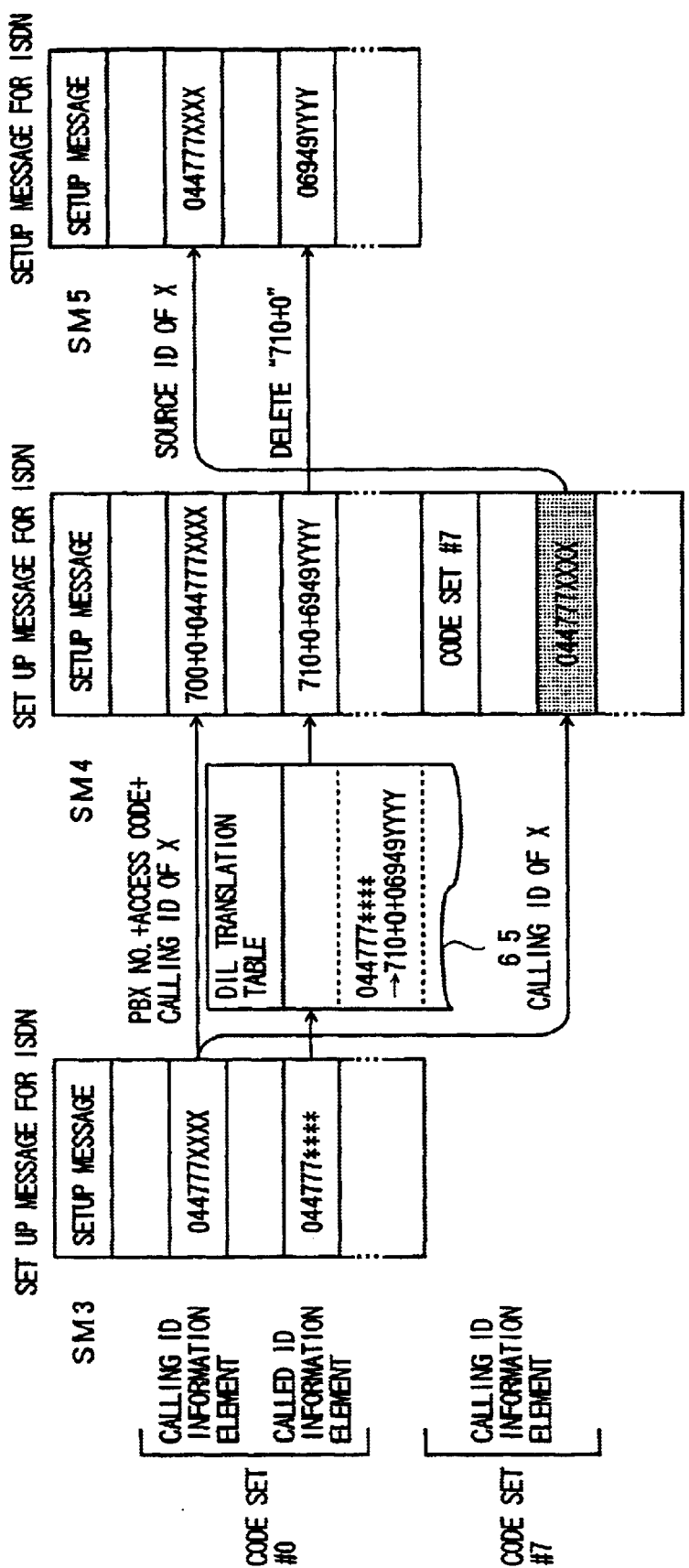
FIG. 12 is a diagram showing call setup messages used in the second operation.

A description will be given of the case where the telephone set 42 calls the telephone set 44, as indicated by a broken line shown in FIG. 10. FIG. 11 is a sequence diagram showing how information is transferred. FIG. 12 shows call setup messages used in the present case.

At step S10, the telephone set 42 connected to the ISDN 34 sends a call to the PBX 30. Hence, the ISDN 34 sends a call setup message SM3 shown in FIG. 12 to the PBX 30. The call setup message SM3 includes "044777XXXX" as the calling ID information element of code set #0, and "044777****" as the called ID information element.

At step S12, the call setup message SM3 arrives at the PBX 30, which extracts, at step S14, the calling ID information element and the called ID information element from code set #0 of the call setup message SM3. At step S16, the controller 54 refers to the DIL translation table 65 by referring to the called ID information element extracted at step S14, and translates it into the via-PBX32 called ID information element. In the present case, "044777****" is translated into "710+0+06949YYYY". At step S18, the controller 54 identifies the connection called from the called ID information. In the present case, the connection called is the ISDN tie line 36, and thus the process proceeds to step S20. At step S20, a call setup message SM4 to be transferred over the ISDN tie line 36 is assembled. In the above call setup message SM4, the PBX number "700" of the PBX 32 is written into the calling ID information element M1 of code set #0 shown in FIG. 4. Further, the call setup message SM4 includes the prefix dial number "0" and the extracted calling ID information element "044777XXXX". Further, in the call setup message SM4, the via-PBX32 called ID information element "710+0+06949YYYY" obtained by the translation of step S16 is written into the called ID information element of code set #0 of the call setup message SM4. Further, the calling ID information element "044777XXXX" extracted at step S14 is written into the calling ID information element M3 of code set #7. The call setup message SM4 thus assembled is sent to the PBX 32 at step S22.

At step S24, the controller 54 of the PBX 32 extracts the calling ID information element "044777XXXX" of the telephone set 42 from the calling ID information element of code set #7 of the call setup message SM4 transferred over the ISDN tie line 36, and further extracts the called ID information element of code set #0 therefrom. At step S26, the controller 54 identifies the connection called from the called ID information element extracted at step S24. In the present case, the connection called is the telephone set 44 connected to the ISDN 34, and the process proceeds to step S32.

At step S32, the controller 54 writes the calling ID information element "044777XXXX" of the call telephone set 42 extracted at step S24 into the calling ID information element M1 of code set #0 shown in FIG. 4. Further, the controller 54 deletes the PBX number and the prefix dial number "710" from the called ID information element "710+0+06949YYYY" extracted at step S24. Then, the rest of the called ID information element is written into the called ID information element M2 of code set #0. A call setup message SM5 shown in FIG. 12 and thus configured as described above is sent to the ISDN 34.

At step S34, at the time when the call arrives at the telephone set 44, the calling ID information element "044777XXXX" is displayed on the terminal telephone set 44, so that the telephone set 44 can reply to the telephone set by return and a communication between the terminals 42 and 44 can take place.

Figure 14:
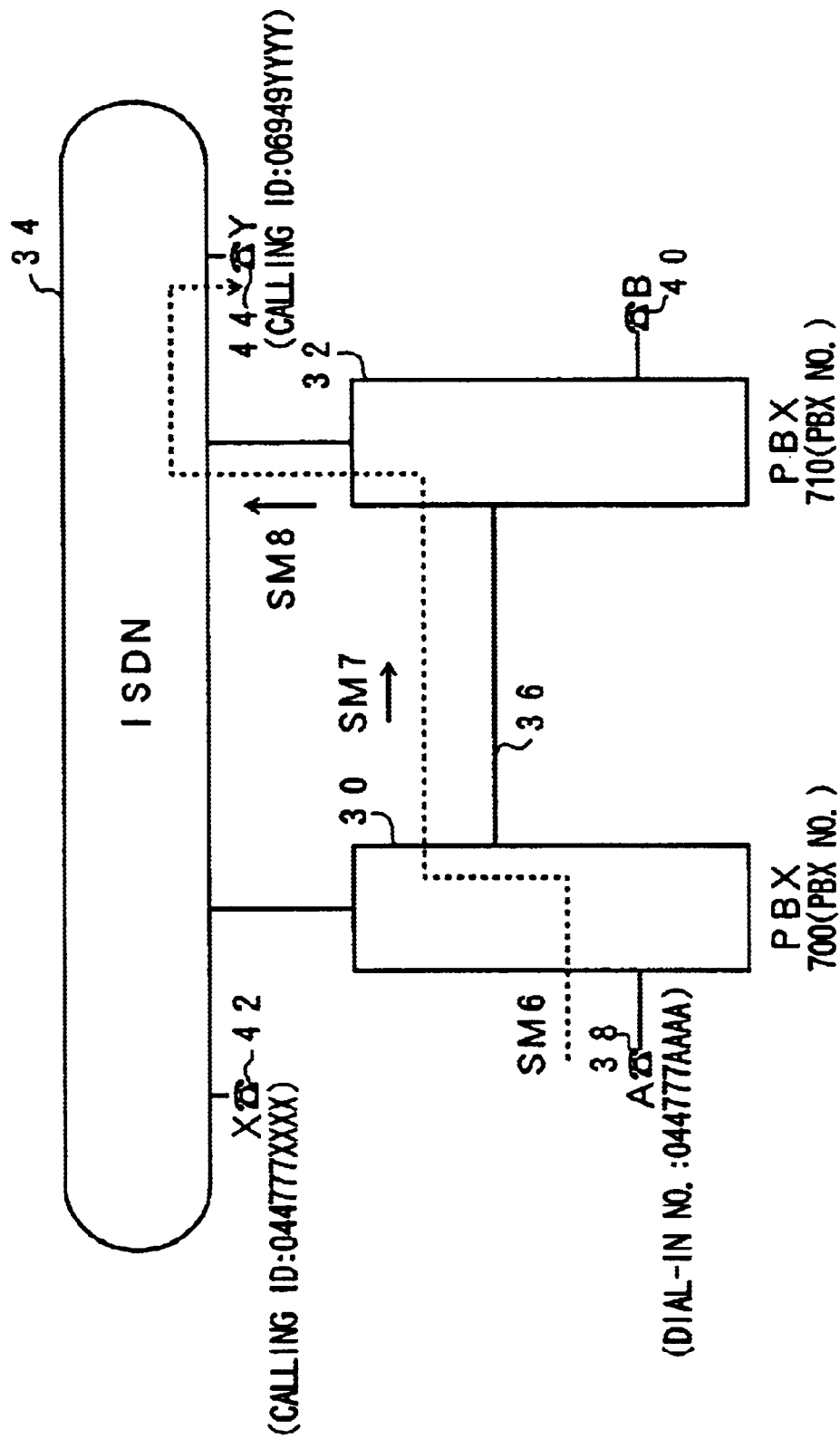
FIG. 14 is a block diagram of a first operation in accordance with the sequence shown in FIGS. 13A and 13B.
Figure 15:
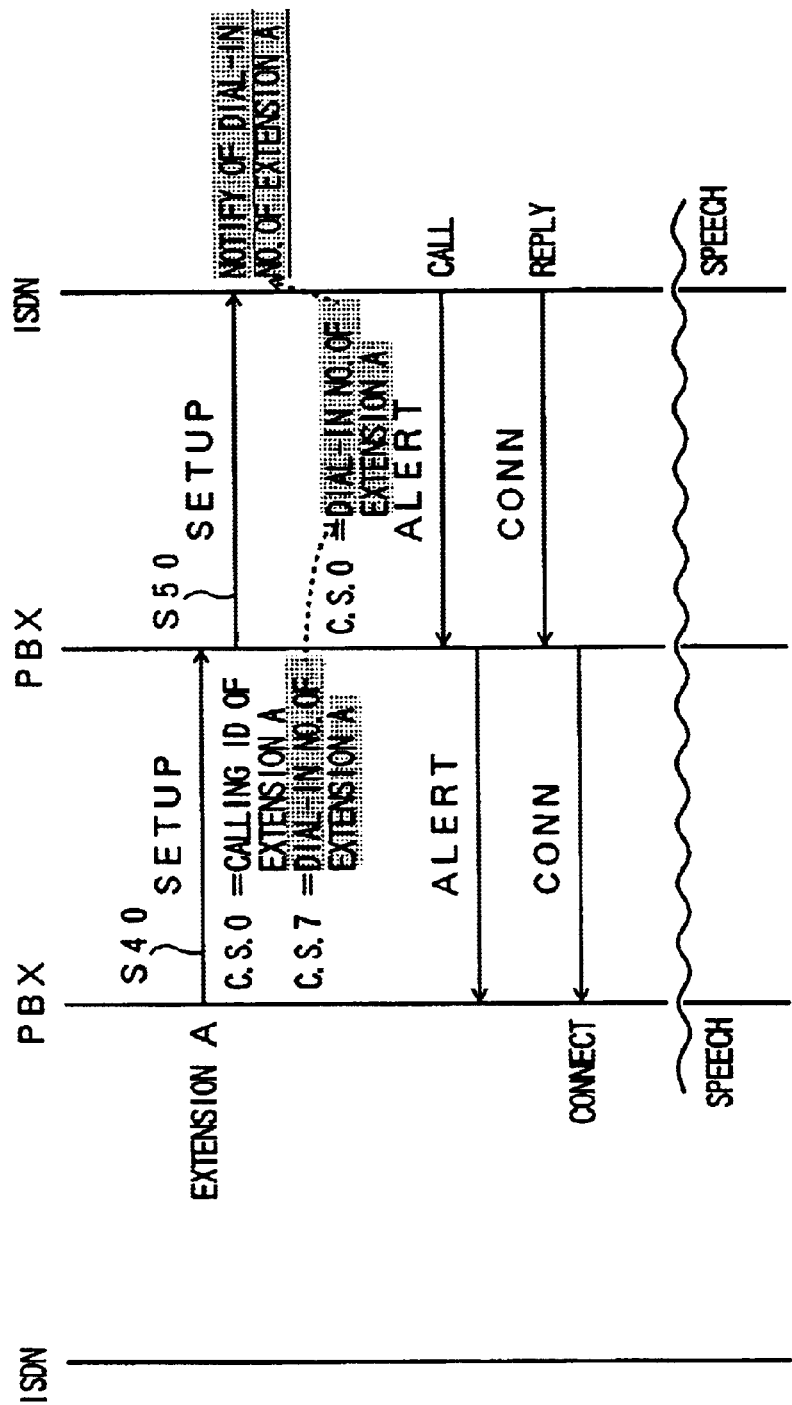
FIG. 15 is a sequence diagram of an information transfer carried out in accordance with the sequence shown in FIGS. 13A and 13B.
Figure 16:
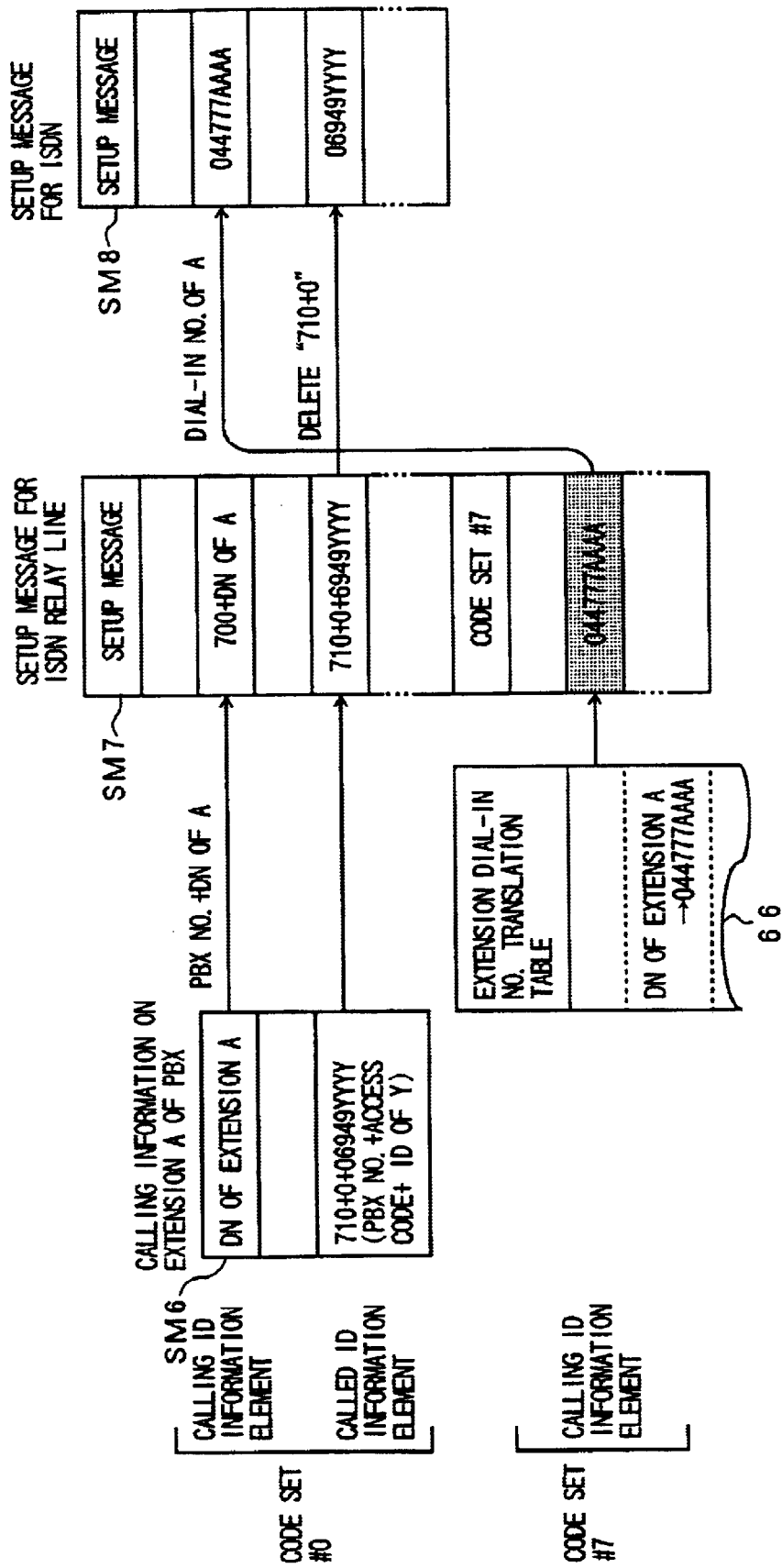
FIG. 16 is a diagram showing call setup messages used in the first operation shown in FIG. 14.

FIG. 14 shows a case where the extension telephone set 38 of the PBX 30 calls the telephone set 44 connected to the ISDN 34. FIG. 15 shows an information transfer sequence in the present case. FIG. 16 shows call setup messages in the present case.

Figure 13A:
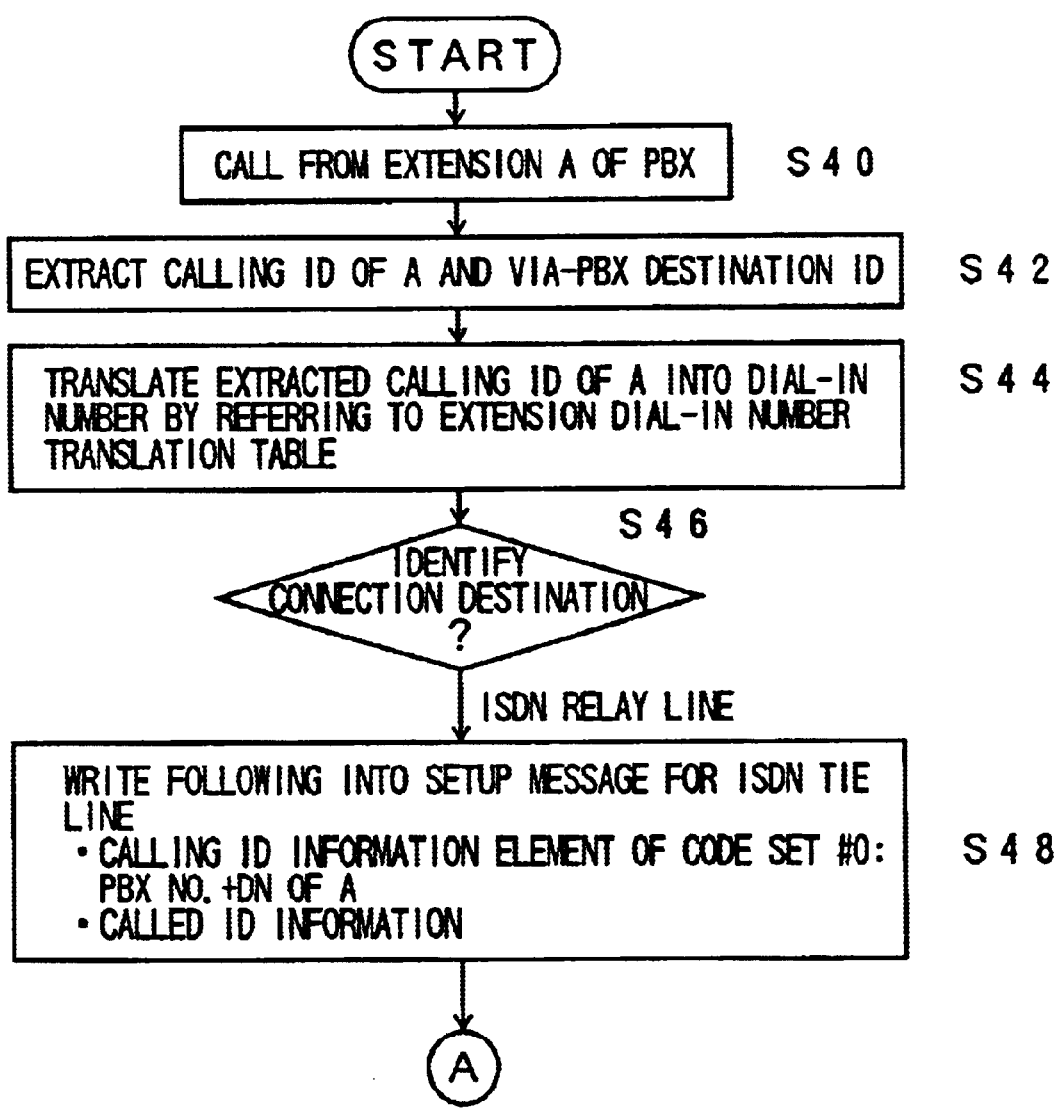
FIGS. 13A and 13B are flowcharts of another sequence of the embodiment of the present invention.

At step S40 shown in FIG. 13A, the extension telephone set 38 calls the PBX 30. At step S42, the controller 54 of the PBX 30 extracts an extension number DN of the extension telephone set 38 and the called ID information element from a message SM6 shown in FIG. 16. The called ID information element includes the number "710" of the PBX 32, the access number "0" for making a connection with the ISDN 34, and the ID of the telephone set 44.

At step S44, the controller 54 of the PBX 30 refers to the extension dial-in number translation table 66 by using the above calling ID information element, and translates it into the dial-in number of the extension telephone set 38. In the present case, the extension number DN is translated into the dial-in number "044777AAAA". At step S46, the controller 54 identifies the connection called from the called ID information. In the present case, the connection called is the ISDN tie line 36, and the process proceeds to step S48. At step S48, a call setup message SM7 (FIG. 16) to be transferred over the ISDN tie line 36 is assembled. The call setup message SM7 includes the PBX number "700" of the PBX 30 and the extension number DN of the extension telephone set 38 written into the calling ID information element M1 of code set #0 shown in FIG. 5. Further, the call setup message SM7 includes the called ID information element "710+0+06949YYYY" written into the called information element of code set #0, and the dial-in number "044777AAAA" obtained by the translation of step S44 and written in the dial-in number M4 of code set #7. At step S50, the call setup message SM7 thus produced is sent to the PBX 32.

At step S52, the controller 54 of the PBX 32 extracts the dial-in number "044777AAAA" of code set #7 of the call setup message SM7 transferred over the ISDN tie line 36, and extracts the called ID information element of code set #0. At step S54, the controller 54 identifies the connection called from the extracted called ID information. In the present case, the connection called is the telephone set 44 connected to the ISDN 34, and thus the process proceeds to step S56.

At step S56, the controller 54 writes the dial-in number "044777AAAA" of the call extension telephone set extracted at step S52 into the calling ID information element M1 of code set #0 shown in FIG. 4. Further, the controller 54 deletes the PBX number and the access number "710" from the called ID information element extracted at step S52, and writes the rest of the called ID information element into the called ID information element of code set #0. A call setup message SM8 shown in FIG. 16 from which code set #7 has been deleted is sent to the ISDN 34.

At step S58, the calling ID information element given in the call setup message SM8 is displayed on the telephone set 44 when receiving the call. Hence, the telephone set 44 can reply to the call from the extension telephone set 38 by return. At step S60, the telephone set 44 responds to the call so that a communication between the extension telephone set 38 and the telephone set 44 can take place.

Figure 17:
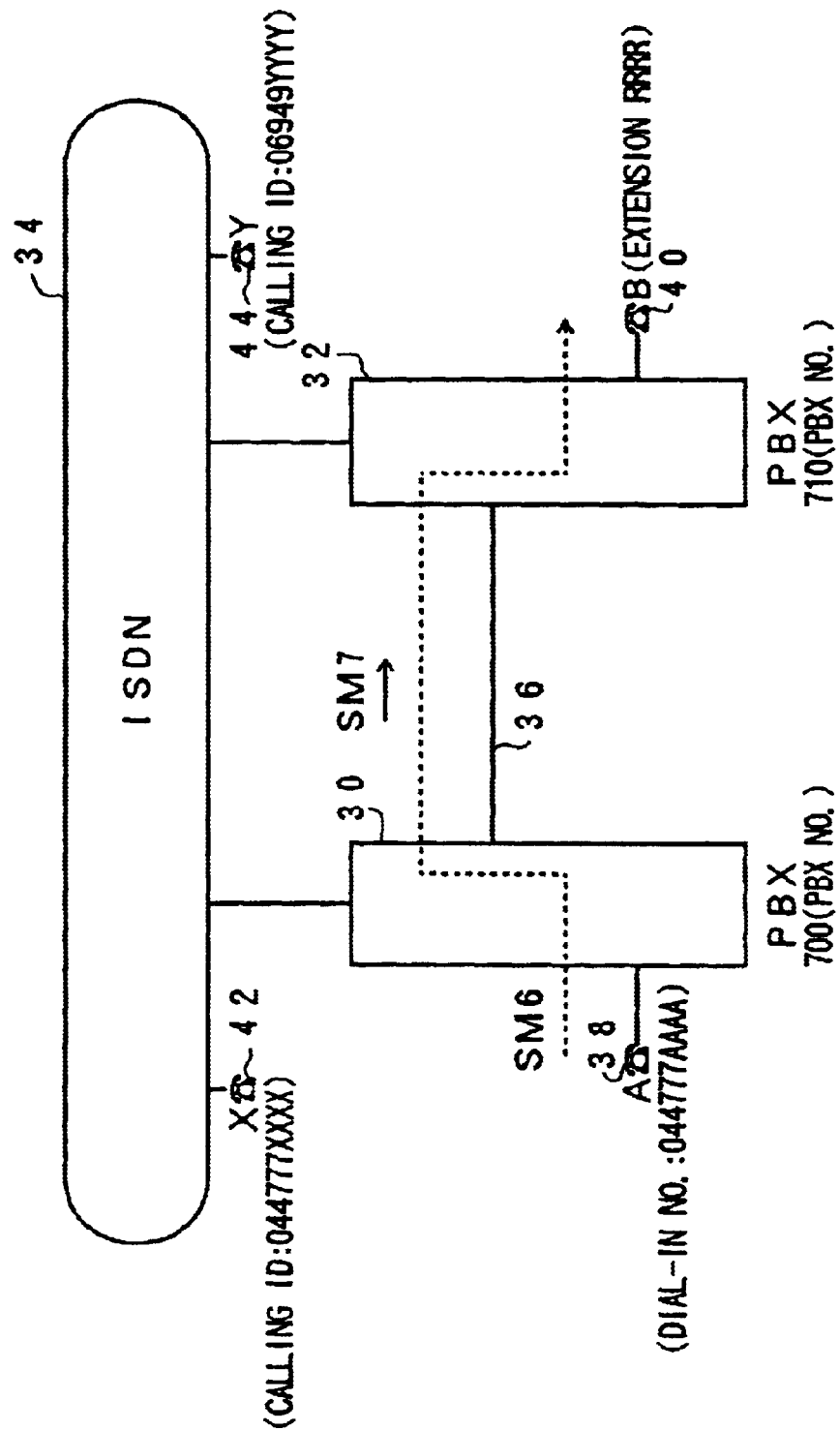
FIG. 17 is a block diagram of a second operation in accordance with the sequence shown in FIGS. 13A and 13B.
Figure 18:
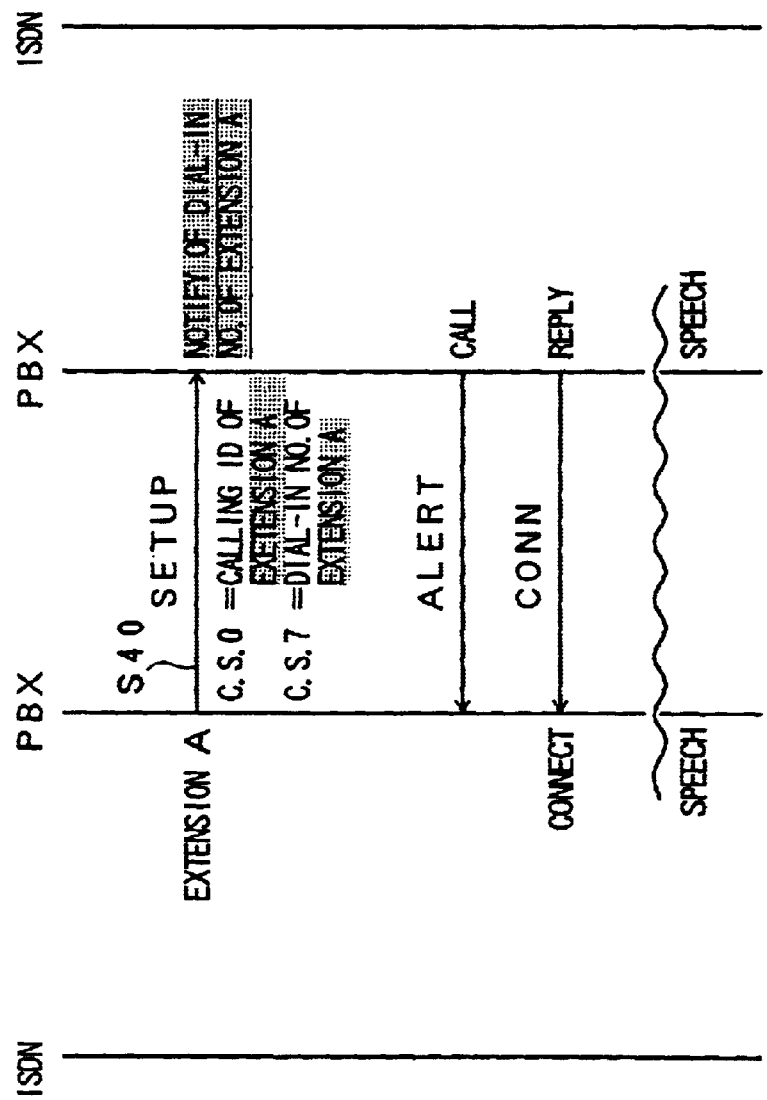
FIG. 18 is a sequence diagram of an information transfer carried out in accordance with the sequence shown in FIGS. 13A and 13B.
Figure 19:
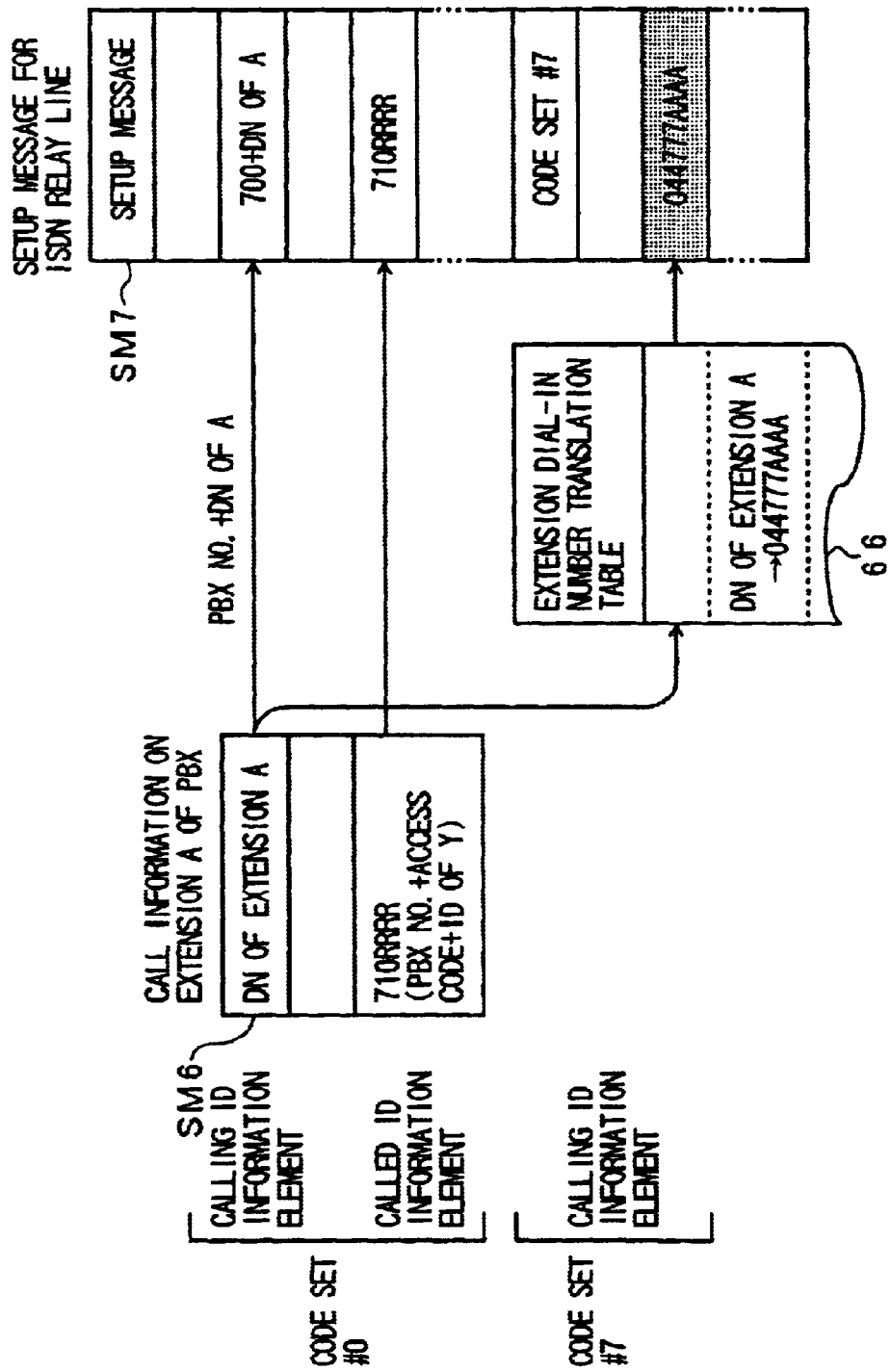
FIG. 19 is a diagram showing call setup messages used in the second operation shown in FIG. 17.

FIG. 17 shows a case where the extension telephone set 38 calls the extension telephone set 40. FIG. 18 shows an information transfer sequence in the case shown in FIG. 17. FIG. 19 shows call setup messages used in the present case.

At step S40, the extension telephone set 38 calls the PBX 30. At step S42, the controller of the PBX 30 extracts the extension number DN of the extension telephone set 38 and the called ID information element from the message SM6 shown in FIG. 19. In the present case, the called ID information element is "710+RRRR".

At step S44, the controller 54 of the PBX 30 refers to the extension dial-in number translation table 66 by using the above calling ID information element, and translates it into the dial-in number of the extension telephone set 38. In the present case, the extension number DN of the extension telephone set 38 is translated into "044777AAAA". At step S46, the controller 54 identifies the connection called from the called ID information element. In the present case, the connection called is the ISDN tie line 36, and thus the process proceeds to step S48. At step S48, the controller 54 assembles the call setup message SM7 shown in FIG. 19 to be transferred over the ISDN tie line 36. In the call setup message SM7, the PBX number "700" of the PBX 30 and the extension number DN of the extension telephone set 38 are written into the calling ID information element M1 of code set #0 shown in FIG. 5. Further, the called ID information element "710+RRRR" is written into the called ID information element of code set #0, and the dial-in number "044777AAAA" obtained by the translation of step S44 is written into the dial-in number M4 of the PBX extension of code set #7. At step S50, the call setup message SM7 thus produced is sent to the PBX 32.

At step S52, the controller 54 of the PBX 32 extracts the dial-in number of the extension 38 from code set #7 from the call setup message SM7 transferred over the ISDN tie line 36, and extracts the called ID information element of code set #0. At step S54, the controller 54 identifies the connection called from the called ID information element extracted at step S54. In the present case, the connection called is the extension telephone set 40 connected to the PBX 32, and thus the process proceeds to step S62. At step S62, the calling ID information element of the extension telephone set 38 extracted at step S52, that is, the dial-in number thereof is set to the extension telephone set 40 when receiving the call. Then, the dial-in number "044777AAAA" is displayed on the extension telephone set 40, so that a return call to the extension telephone set 38 can be made. Thereafter, at step S64, the extension telephone set 40 responds to the call from the extension telephone set 38, so that a communication between the telephone sets 40 and 42 can take place.

Figure 13B:
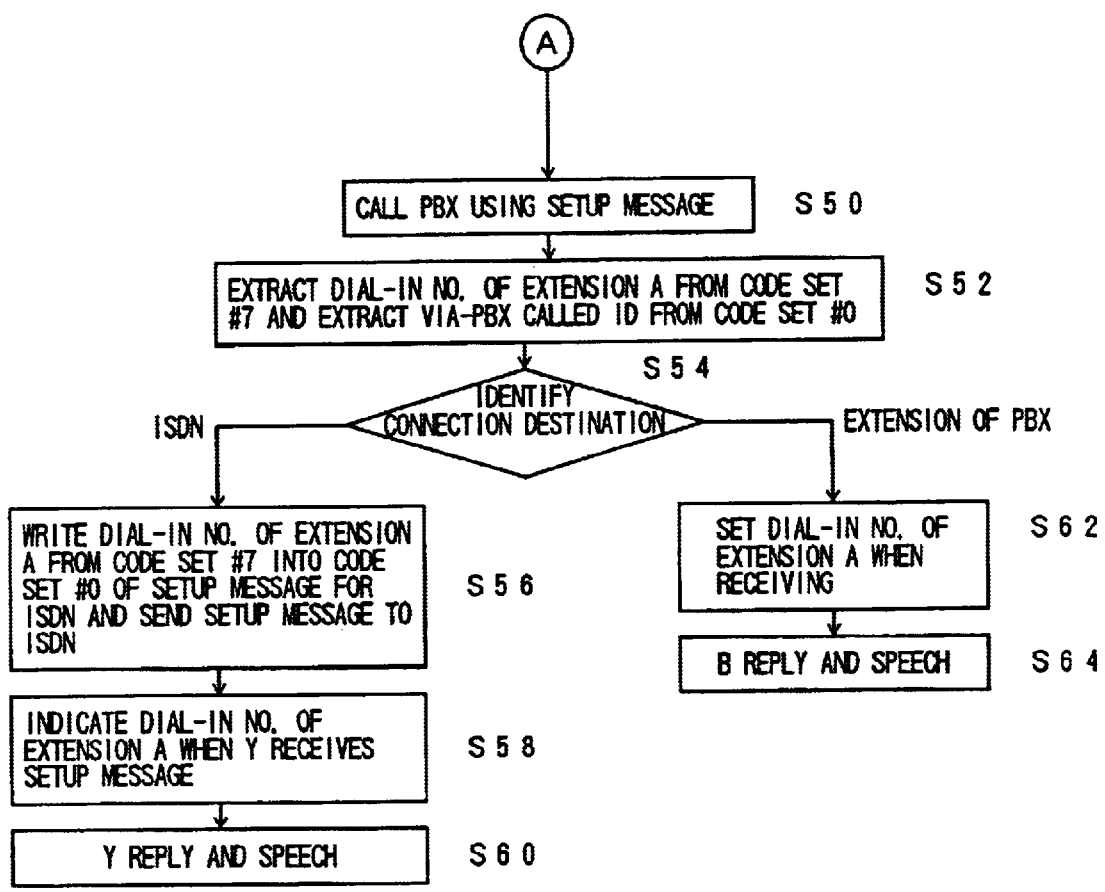
Figure 20A:
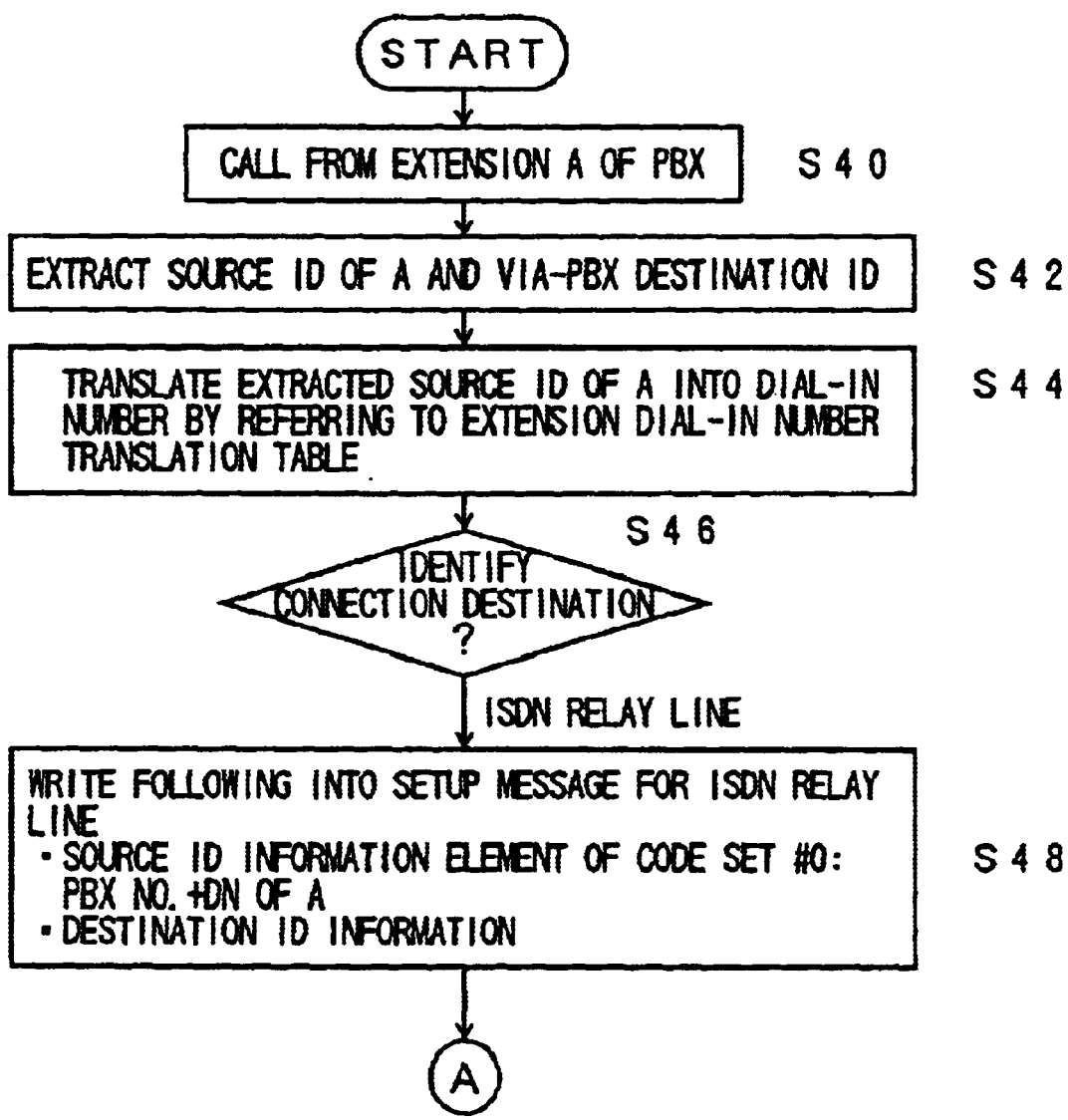
FIGS. 20A and 20B are flowcharts of yet another sequence of the embodiment of the present invention.
Figure 20B:
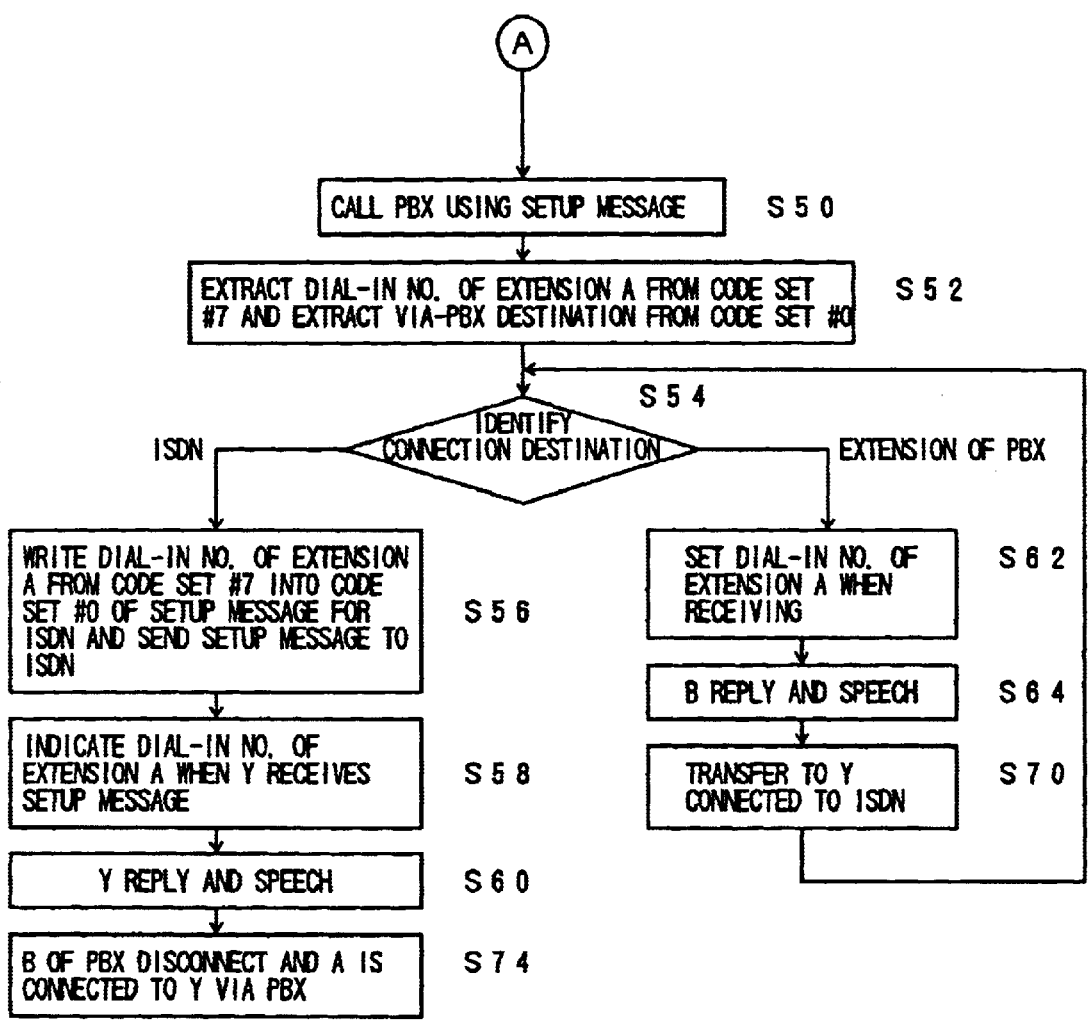
Figure 21:
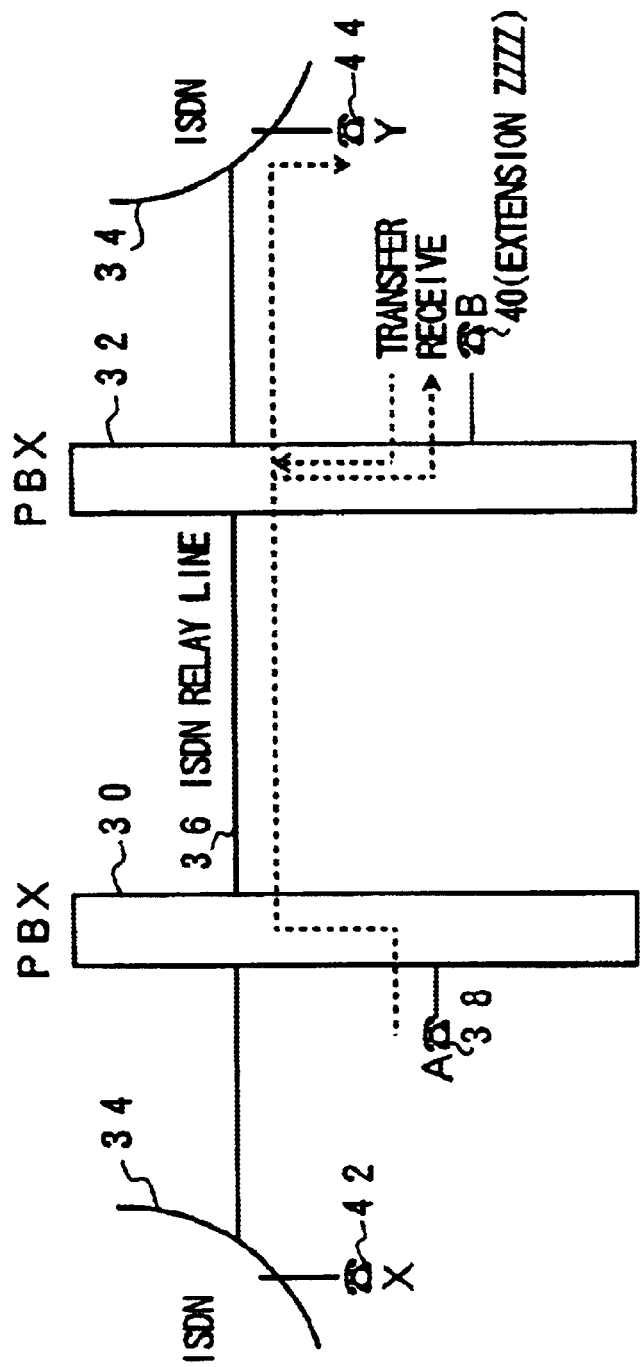
FIG. 21 is a block diagram of a first operation in accordance with the sequence shown in FIGS. 20A and 20B.
Figure 22:
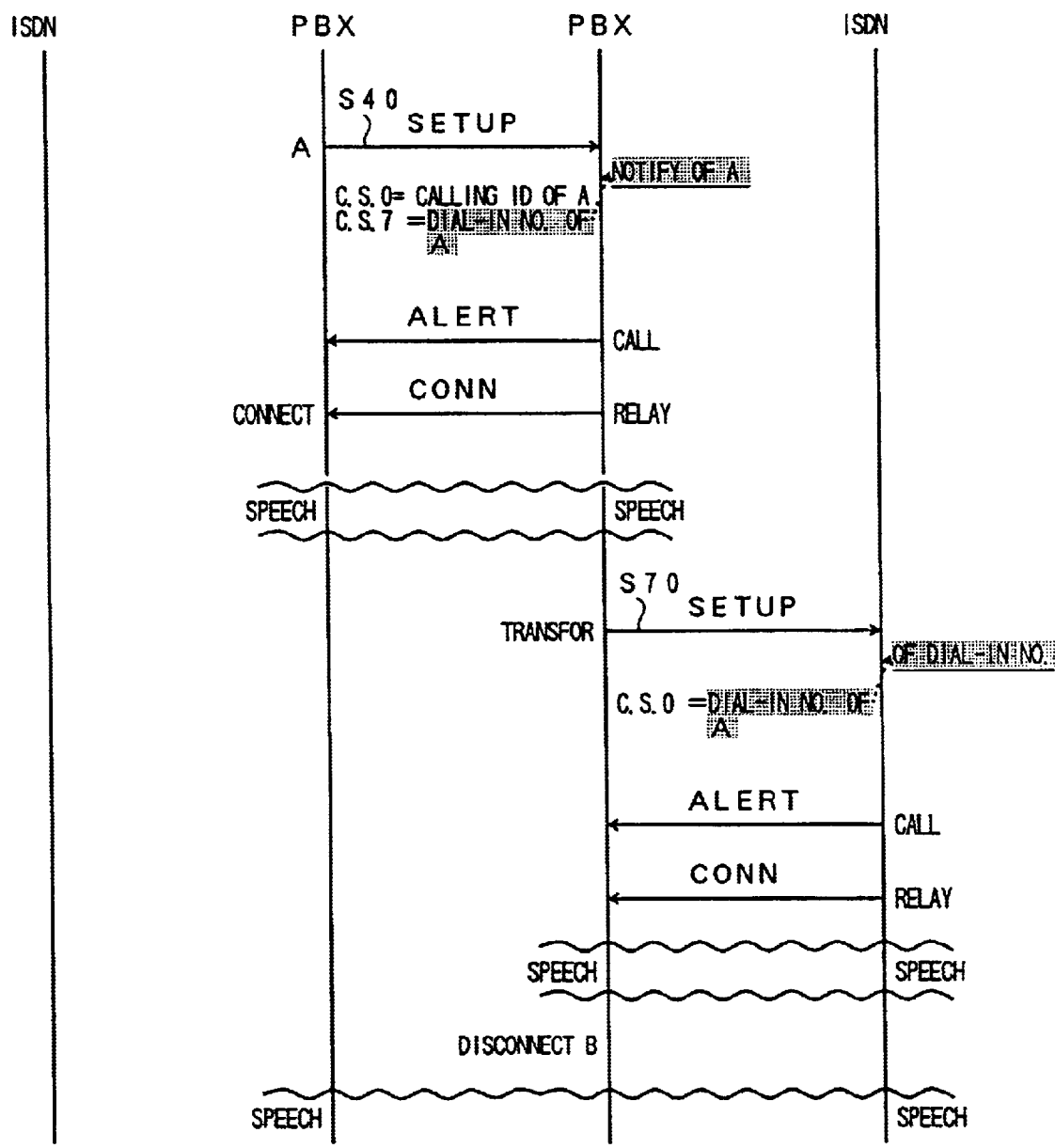
FIG. 22 is a sequence diagram of an information transfer carried out during the first operation shown in FIG. 21.

FIGS. 20A and 20B are flowcharts of a sequence in which the extension telephone set 38 calls the extension telephone set 40 via the PBX 30, the ISDN tie line 36 and the PBX 32, as indicated by a broken line shown in FIG. 21, and the above call is transferred to a telephone set 44 connected to the ISDN 34. In FIGS. 20A and 20B, parts that are the same as those shown in FIGS. 13A and 13B are given the same reference numbers. Further, FIG. 22 shows an information transfer sequence in the present case.

At step S40, the extension telephone set 38 calls the PBX 30. At step S42, the controller 54 of the PBX 30 extracts the extension number DN of the extension telephone set 38 and the called ID information element from the message SM6 shown in FIG. 19. In the present case, the called ID information element is "710+RRRR".

The controller 54 of the PBX 30 refers to the extension dial-in number translation table 66 by using the calling ID information element, and translates it into the dial-in number of the extension telephone set 38. In the present case, the extension number DN is translated into "044777AAAA". In step S46, the controller 54 identifies the connection called by referring to the called ID information. In the present case, the connection called is the ISDN tie line 36, and thus the process proceeds with step S48. At step S48, the controller 54 assembles the call setup message SM7 (FIG. 19) to be transferred over the ISDN tie line 36. In the call setup message SM7, the PBX number "700" of the PBX 32 and the extension number DN of the extension telephone set 38 are written into the calling ID information element of code set #0 shown in FIG. 5. The called ID information element "710+RRRR" is written into the called ID information element M2 of code set #0. The dial-in number "044777AAAA" obtained by the translation of step S44 is written into the dial-in number M4 of code set #7. At step S50, the call setup message SM7 is sent to the PBX 32 shown in FIG. 19.

At step S52, the controller 54 of the PBX 32 extracts the dial-in number "044777AAAA" of code set #7 from the call setup message SM7 transferred over the ISDN tie line 36, and extracts the called ID information element of code set #0. At step S54, the controller 54 identifies the connection called from the called ID information element extracted at step S52. In the present case, the connection called is the extension telephone set 40 of the PBX 32, and the process proceeds to step S62. At step S62, the controller 54 sets the calling ID information element of the call extension telephone set 38 extracted at step S52, that is, the dial-in number thereof to the extension telephone set 40. Hence, the dial-in number "044777AAAA" is displayed on the extension telephone set 40. At step S64, the extension telephone set 40 replies to the call from the telephone set 38 so that a communication therebetween can take place.

When it is found, during speech communication, that the operator A of the telephone set 38 wishes to make a speech communication with the operator Y of the telephone set 44 connected to the ISDN 34, at step S70, a call addressed to the telephone set 44 is made by the extension telephone set 40, and the process proceeds to step S54. At step S54, the connection called is identified. In the present case, the connection called is the telephone set 44 connected to the ISDN 34, and thus the process proceeds to step S56.

At step S56, the dial-in number "044777AAAA" of the extension telephone set extracted at step S52 is written into the calling ID information element M1 of code set #0 shown in FIG. 4. Further, "06949YYYY" of which the operator of the extension telephone set 38 of the PBX 30 informed the operator of the extension telephone set 40 of the PBX 32 is written into the called ID information element M2. Then, the resultant call setup message SM8 shown in FIG. 16 from which code set #7 has been deleted is sent to the ISDN 34.

At step S58, the call setup message SM8 is received by the telephone set 44 on which the calling ID information element included therein, that is, the dial-in number "044777AAAA" is displayed. Hence, a return call can be made. At step S60, the telephone set 44 replies to the call, and a communication between the telephone sets 44 and 40 can take place.

Figure 23A:
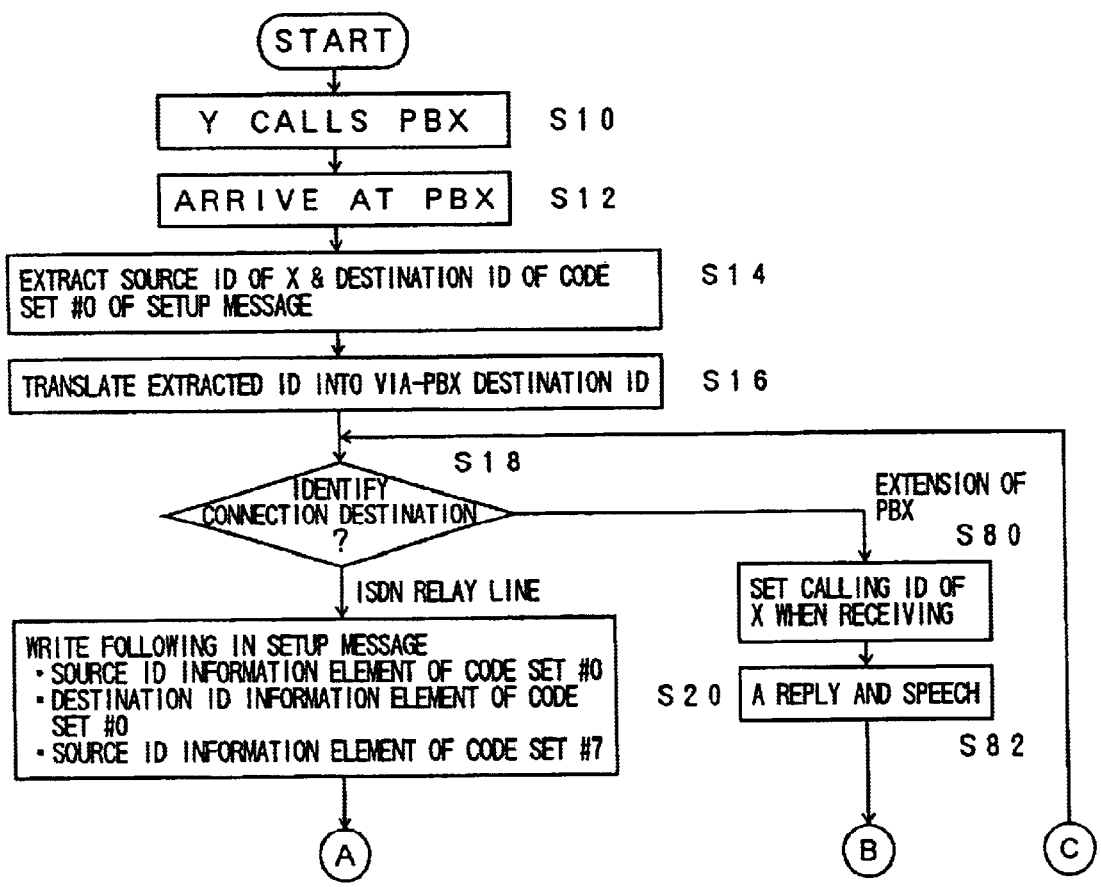
FIGS. 23A and 23B are flowcharts of a further sequence of the embodiment of the present invention.
Figure 23B:
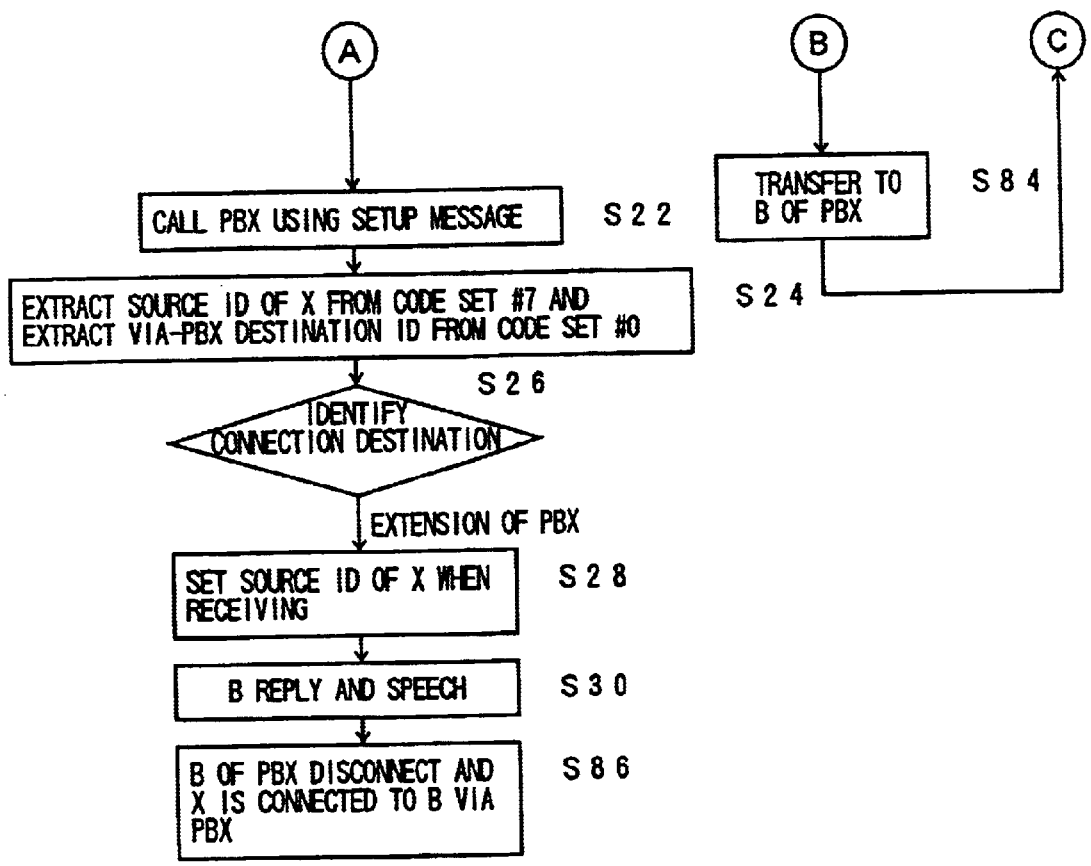
Figure 24:
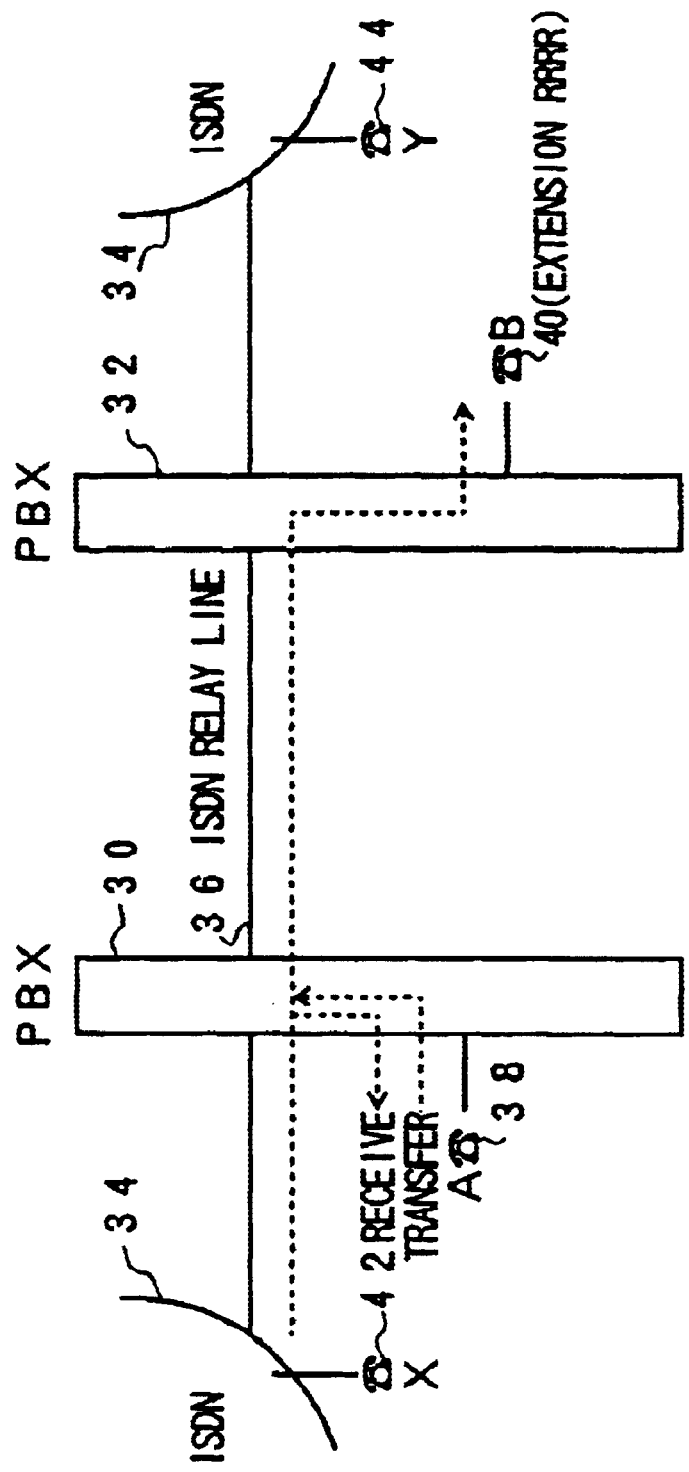
FIG. 24 is a block diagram of an operation in accordance with the sequence shown in FIGS. 23A and 23B.
Figure 25:
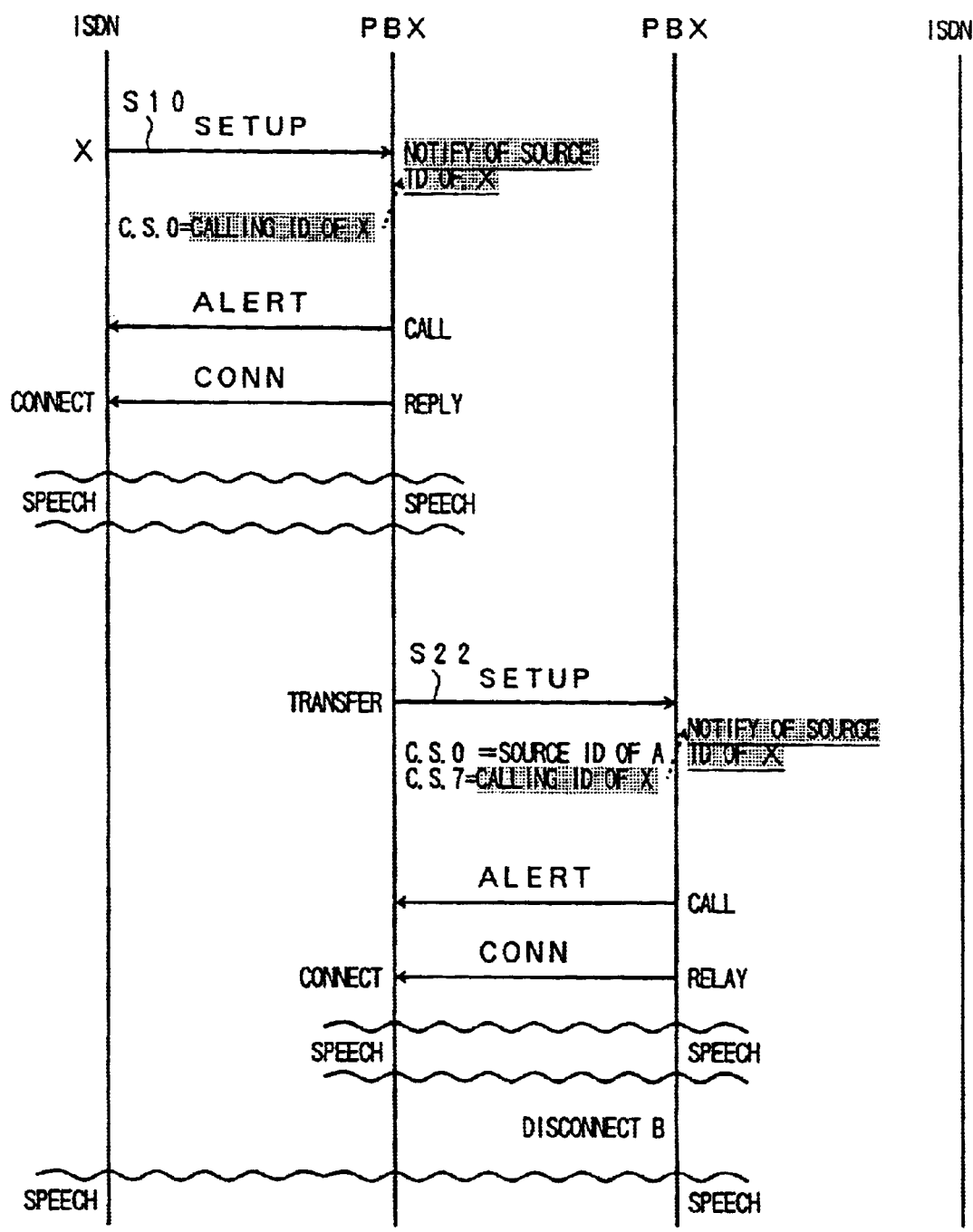
FIG. 25 is a sequence diagram of an information transfer carried out during the operation shown in FIG. 24.

FIGS. 23A and 23B are flowcharts of a sequence in which the telephone set 42 calls the extension telephone set 38 via the ISDN 34 and the PBX 30, and the call is transferred to the extension telephone set 40 of the PBX 32, as shown in FIG. 24. In FIGS. 23A and 23B, parts that are the same as those shown in FIGS. 6A and 6B are given the same reference numbers. FIG. 25 shows an information transfer sequence in the present case.

At step S10, the telephone set 42 connected to the ISDN 34 calls the PBX 30. Thus, the call setup message SM1 is sent to the PBX 30 from the ISDN network 34. In the call setup message SM1, "044777XXXX" is written into the calling ID information element of code set #0, and "044777EFGH" is written into the called ID information element.

The PBX 30 receives the call setup message at step S12, and extracts the calling ID information element and the called ID information element from code set #0 of the call setup message SM1. At step S16, the controller 54 of the PBX 30 refers to the DIL translation table 65 by using the called ID information element extracted at step S14, and translates it into the via-PBX32 called ID information element. In the present case, the called ID information element indicates the extension telephone set 38, and thus the process proceeds to step S80. At step S80, the controller 54 sets the calling ID information element to the extension telephone set 38 and causes this element to be displayed thereon when receiving the call. At step S82, the extension telephone set 38 replies to the call, and thus a communication between the telephone sets 42 and 38 can take place. When it is found, during speech communication, that the operator of the telephone set 42 wishes to make a speech communication with the extension telephone set 40 of the PBX 32, at step S84, a call addressed to the telephone set 40 is made by the extension telephone set 38, and the process proceeds to step S18.

At step S18, the controller 54 of the PBX 30 identifies the connection called from the called ID information element. In the present case, the connection called is the ISDN tie line 36, and thus the process proceeds to step S20. At step S20, the controller 54 assembles the call setup message to be transmitted over the ISDN tie line 36. In the call setup message, the PBX number "700" of the PBX 32, the access number "0" for making a connection to the ISDN 34, and the extracted calling ID information element "044777XXXX" are written into the calling ID information element. Further, the orally informed "710+ZZZZ" of the extension telephone set 38 is written into the called ID information element M2 of code set #0. Furthermore, the calling ID information element "044777XXXX" extracted at step S14 is written into the calling ID information element M3 of code set #7. At step S22, the call setup message thus produced is sent to the PBX 32.

At step S24, the controller 54 of the PBX 32 extracts the calling ID information element "044777XXXX" of the telephone set 42 from code set #7 of the call setup message, and extracts the called ID information element from code set #0. At step S26, the controller 54 identifies the connection called from the called ID information element. In the present case, the connection called is the extension telephone set 40 of the PBX 32, and thus the process proceeds to step S28. At step S28, the calling ID information element of the call telephone set 42 extracted at step S24 is set to the extension telephone set 40, on which the calling ID information element "044777XXXX" is displayed. Hence, a return call can be made. At step S30, the extension telephone set 40 replies to the call, so that a speech communication between the telephone sets 42 and 40 can take place.

Then, the process proceeds to step S86, at which the extension telephone set 38 is disconnected and the telephone sets 42 and 40 are connected by the PBX 30, so that a speech communication therebetween can take place.

The present invention is not limited to the specifically disclosed embodiments, and variations and modifications may be made without departing from the scope of the present invention.

What is claimed is:

1. A switch device connectable to an ISDN and an ISDN tie line, said switch device comprising:
   a first part which adds a calling ID information element to code set #7 and to code set #0 of a first type of call setup message to be transferred over said ISDN tie line connecting said switch device to another switch device,
   said calling ID information element including identification information on a first terminal which is physically connected to the ISDN and makes a call, wherein said code set #7 is not used in a second type of call setup message transferred over said ISDN, said ISDN tie line being a public line, the second type of call setup message only using said code set #0.

2. The switch device as claimed in claim 1, further comprising a second part which receives the first type of call setup message transferred via the ISDN tie line from another switch device and writes the calling ID information element of a second terminal into the second type of call setup message to be transferred over the ISDN so that the switch device calls the first terminal connected to the ISDN.

3. The switch device as claimed in claim 1, further comprising a second part which allows a first extension terminal connected to the switch device to communicate with the first terminal connected to the ISDN upon receiving a call therefrom and then calls a second extension terminal connected to another switch device or a second terminal connected to the ISDN via the ISDN tie line.

4. The switch device as claimed in claim 2, further comprising a third part which allows a first extension terminal connected to the switch device to communicate with the first terminal connected to the ISDN upon receiving a call therefrom and then calls a second extension terminal connected to another switch device or a third terminal connected to the ISDN via the ISDN tie line.

5. A switch device connectable to an ISDN and an ISDN tie line, said switch device comprising:
   a first part which translates an extension number of a first extension terminal connected to the switch device into a dial-in number; and
   a second part which adds the dial-in number to code set #7 and to code set #0 of a first type of call setup message to be transferred over said ISDN tie line physically connecting said switch device to another switch device, wherein said code set #7 is not used in a second type of call setup message transferred from said first extension terminal to said switch device, said ISDN tie line being a public line, the second type of call setup message only using said code set #0.

6. The switch device as claimed in claim 5, further comprising a third part which receives the first call setup message transferred via the ISDN tie line from another switch device and writes the dial-in number into a second call setup message to be transferred over the ISDN so that the switch device calls the terminal connected to the ISDN.

7. The switch device as claimed in claim 6, further comprising a fourth part which allows a third extension terminal connected to the switch device to communicate with the terminal connected to the ISDN upon receiving a call therefrom and then calls a fourth extension terminal connected to another switch device or another terminal connected to the ISDN via the ISDN tie line.

8. A system comprising:
   a first switch device and a second switch device which are connected to an ISDN, said first switch device comprising:
   a first part which adds a calling ID information element to code set #7 and to code set #0 of a first type of call setup message to be transferred over an ISDN tie line connecting the first and second switch devices together,
   said calling ID information element including identification information on a first terminal which is physically connected to the ISDN and makes a call, wherein said code set #7 is not used in a second type of call setup message transferred over said ISDN, said ISDN tie line being a public line, the second type of call setup message only using said code set #0.

9. The system as claimed in claim 8, wherein the second switch device comprises a second part which receives the first type of call setup message transferred from the first switch device via the ISDN tie line and writes the calling ID information element into the second type of call setup message to be transferred over the ISDN so that the second switch device calls a second terminal connected to the ISDN.

10. The system as claimed in claim 8, wherein the first switch device comprises a second part which allows a first extension terminal connected to the first switch device to communicate with the first terminal connected to the ISDN upon receiving a call therefrom and then calls a second extension terminal connected to the second switch device or a second terminal connected to the ISDN via the ISDN tie line.

11. The system as claimed in claim 9, wherein the first switch device comprises a third part which allows a first extension terminal connected to the first switch device to communicate with the first terminal connected to the ISDN upon receiving a call therefrom and then calls a second extension terminal connected to the second switch device or a second terminal connected to the ISDN via the ISDN tie line.

12. A system comprising:
   a first switch device and a second switch device connected to an ISDN, and first switch device comprising:
      a first part which translates an extension number of a first extension terminal connected to the first switch device into a dial-in number; and
      a second part which adds the dial-in number to code set #7 and to code set #0 of a first type of call setup message to be transferred to the second switch device over an ISDN tie line physically connecting the first and second switch devices together, wherein said code set #7 is not used in a second type of call setup message transferred from said first extension terminal to said first switch device, said ISDN tie line being a public line, the second type of call setup message only using said code set #0.

13. The system as claimed in claim 12, wherein the second switch device comprises a third part which receives the first type of call setup message transferred over the ISDN tie line from the first switch device and writes the dial-in number into a second type of call setup message to be transferred over the ISDN so that the second switch device calls a first terminal connected to the ISDN.

14. The system as claimed in claim 13, wherein the first switch device comprises a fourth part which allows a second extension terminal connected to the first switch device to communicate with a second terminal connected to the ISDN upon receiving a call therefrom and then calls a third extension terminal connected to the second switch device or a third terminal connected to the ISDN via the TSDN tie line.

* * * * *